(12) United States Patent  
Okamoto et al.

(10) Patent No.: US 8,994,808 B2  
(45) Date of Patent: Mar. 31, 2015

(54) MICROSCOPE SYSTEM, SURFACE STATE OBSERVING METHOD, AND SURFACE STATE OBSERVING PROGRAM

(75) Inventors: Yoichi Okamoto, Osaka (JP); Takuya Karube, Osaka (JP)

(73) Assignee: Keyence Corporation, Osaka (JP)

( * ) Notice: Subject to any disclaimer, the term of this patent is extended or adjusted under 35 U.S.C. 154(b) by 588 days.

(21) Appl. No.: 13/346,304

(22) Filed: Jan. 9, 2012

(65) Prior Publication Data

US 2012/0188360 A1 Jul. 26, 2012

(30) Foreign Application Priority Data

Jan. 24, 2011 (JP) ................... 2011-012032

(51) Int. Cl.
*H04N 7/18* (2006.01)
*G02B 21/36* (2006.01)

(52) U.S. Cl.
CPC .................. *G02B 21/365* (2013.01)
USPC ........................................... 348/79

(58) Field of Classification Search
CPC .................................................. G02B 21/365
See application file for complete search history.

(56) References Cited

U.S. PATENT DOCUMENTS 6,259,473 B1 * 7/2001 Iko et al. .................. 348/80

FOREIGN PATENT DOCUMENTS

| JP | 08-214211 | 8/1996 |
|---|---|---|
| JP | 2007-041120 | 2/2007 |
| JP | 2008-083601 | 4/2008 |
| JP | 2008-299711 | 12/2008 |
| JP | 2008-301331 | 12/2008 |
| JP | 2008-301332 | 12/2008 |

* cited by examiner

*Primary Examiner* — Andy Rao
*Assistant Examiner* — Tyler Edwards
(74) *Attorney, Agent, or Firm* — Kilyk & Bowersox, P.L.L.C.

(57) ABSTRACT

To provide a microscope system enabling the user to accurately observe the surface of the observing target in a short time. A sensitivity parameter for adjusting a value of the pixel data corresponding to a plurality of pixels is set. The pixel data is acquired with a first sensitivity value set as the sensitivity parameter, and the number of pixels in which the peak value of the pixel data is smaller than or equal to a threshold value is detected. A ratio of the detected number of pixels with respect to the total number of pixels region is calculated, where the pixel data is acquired by a second sensitivity value different from the first sensitivity value when the ratio is greater than or equal to a reference value, and the pixel data is not acquired by the second sensitivity value when the ratio is smaller than the reference value.

8 Claims, 11 Drawing Sheets

MICROSCOPE SYSTEM, SURFACE STATE OBSERVING METHOD, AND SURFACE STATE OBSERVING PROGRAM

CROSS-REFERENCE TO RELATED APPLICATIONS

The present application claims foreign priority based on Japanese Patent Application No. 2011-012032, filed Jan. 24, 2011, the contents of which is incorporated herein by reference.

BACKGROUND OF THE INVENTION

1. Field of the Invention

The present invention relates to a microscope system, a surface state observing method, and a surface state observing program.

2. Description of Related Art

In a confocal microscope, the laser light emitted from a laser light source is collected on a measuring target by an objective lens. The reflected light from the measuring target is collected by a light receiving lens, and entered to a light receiving element through a pin hole (see e.g., Japanese Laid-Open Patent Publication No. 2008-83601). The laser light is two-dimensionally scanned on the surface of the measuring target. The distribution of the light receiving quantity of the light receiving element changes by changing the relative distance between the measuring target and the objective lens. A peak of the light receiving quantity appears when focused on the surface of the measuring target. An ultradeep image having a very high focal depth can be obtained based on a peak intensity of the distribution of the light receiving quantity. Furthermore, a height image indicating high distribution of the surface of the measuring target can be obtained based on the peak position of the distribution of the light receiving quantity.

[Patent document 1] Japanese Laid-Open Patent Publication No. 2008-83601

SUMMARY OF THE INVENTION

An output signal of a light receiving element of the confocal microscope is converted to a digital signal by an A/D converter (analog/digital converter), and output as pixel data corresponding to each pixel. Confocal image data is generated based on the pixel data of a constant region at a plurality of positions in the up and down direction of the measuring target, and the ultradeep image or the height image of the observing target is displayed on the display unit based on the plurality of confocal image data.

If the quantity of the reflected light from the surface of the observing target is large, the output signal of the light receiving element might saturate. The peak intensity and the peak position of the distribution of the light receiving quantity then may not be detected. In such a case, the saturation of the output signal of the light receiving element can be prevented by setting the sensitivity parameter such as gain of the light receiving element low. If the quantity of the reflected light from the surface of the observing target is small, on the other hand, the level of the output signal of the light receiving element may become smaller than the level of the noise. The peak of the distribution of the light receiving quantity then cannot be identified from the noise. In such a case, the level of the output signal of the light receiving element can be made higher than the level of the noise by setting the sensitivity parameter high.

However, a region where the quantity of the reflected light is large and a region where the quantity of the reflected light is small coexist due to the state of the surface of the observing target. In such a case, the state of the surface of the observing target cannot be accurately detected unless the sensitivity parameter is set to a value different for every region of the observing target.

The task of the user to set the sensitivity parameter to an appropriate value according to the state of the surface of the observing target is troublesome and takes time.

It is an object of the present invention to provide a microscope system, a surface state observing method, and a surface state observing program enabling the user to accurately observe the state of the surface of the observing target in a short time without carrying out a troublesome task.

(1) A microscope system according to one embodiment of the present invention relates to a microscope system for observing a state of a surface of an observing target, the microscope system including a light source for emitting a light; a light receiving element; an optical system for irradiating the light emitted from the light source on the observing target while collecting the light, and guiding the light irradiated on the observing target to the light receiving element; a pixel data output unit for outputting pixel data corresponding to a plurality of pixels based on an output signal of the light receiving element; a sensitivity setting unit for setting a sensitivity parameter for adjusting a value of the pixel data by controlling at least one of the light source, the optical system, or the light receiving element; and an image data generating unit for carrying out a first measurement for generating image data for every pixel indicating a state of a surface of the observing target based on the pixel data output by the pixel data output unit with the sensitivity parameter set to a first value by the sensitivity setting unit, and a second measurement for generating image data for every pixel indicating a state of the surface of the observing target based on the pixel data output by the pixel data output unit with the sensitivity parameter set to a second value greater than the first value by the sensitivity setting unit; wherein the image data generating unit generates a determination value for determining whether or not to carry out the second measurement based on the image data generated at the time of the first measurement, determines whether or not the result of the first measurement satisfies a condition defined in advance based on the generated determination value, carries out the second measurement if the result of the first measurement does not satisfy the condition and generates surface image data indicating a state of the surface of the observing target by synthesizing the image data generated at the time of the first measurement and the image data generated at the time of the second measurement, and does not carry out the second measurement if the result of the first measurement satisfies the condition and generates the surface image data based on the image data generated at the time of the first measurement.

In such microscope system, the light emitted from the light source is irradiated on the observing target while being collected by the optical system, and the light irradiated on the observing target is guided to the light receiving element. Pixel data corresponding to a plurality of pixels is output based on the output signal of the light receiving element.

The first measurement for generating the image data for every pixel is carried out with the sensitivity parameter set to the first value. The determination value for determining whether or not to carry out the second measurement is generated based on the image data generated at the time of the first measurement. Whether or not the result of the first measurement satisfies the condition defined in advance is determined based on the generated determination value.

If the result of the first measurement does not satisfy the condition, the second measurement for generating the image data for every pixel is carried out with the sensitivity parameter set to a second value. The image data is thereby generated with different sensitivity parameters according to the state of the surface of the observing target. The surface image data is generated by synthesizing the image data generated at the time of the first measurement and the image data generated at the time of the second measurement. The state of the surface of the observing target thus can be accurately observed even if the state of the surface of the observing target differs for every region.

If the result of the first measurement satisfies the condition, the second measurement is not carried out and the surface image data is generated based on the image data generated at the time of the first measurement. As the surface image data indicating the state of the surface of the observing target is generated in one measurement, the surface image data can be generated in a short time without carrying out the synthesizing process.

As a result, the user can accurately observe the state of the surface of the observing target in a short time without performing a troublesome task.

(2) The image data generation unit determines whether or not the value of the image data generated at the time of the first measurement is smaller than or equal to a threshold value defined in advance, and generates number of image data having a value of smaller than or equal to the threshold value as the determination value.

Whether or not the value of the image data generated at the time of the first measurement is smaller than or equal to a threshold value defined in advance is determined, and the number of image data having a value of smaller than or equal to the threshold value is generated as the determination value. Thus, whether or not to generate the image data with different sensitivity parameters according to the state of the surface of the observing target can be easily and appropriately determined.

(3) The image data generation unit may synthesize the image data determined to have a value higher than the threshold value of the image data generated at the time of the first measurement and the image data corresponding to the image data determined to have a value smaller than or equal to the threshold value at the time of the first measurement of the image data generated at the time of the second measurement to generate the surface image data indicating the state of the surface of the observing target when the first and second measurements are carried out.

When the first and second measurements are carried out, the image data determined to have a value higher than the threshold value of the image data generated at the time of the first measurement and the image data corresponding to the image data determined to have a value smaller than or equal to the threshold value at the time of the first measurement of the image data generated at the time of the second measurement are synthesized. The surface image data is thereby generated. Therefore, the state of the surface of the observing target can be more accurately observed with a simple process.

(4) The sensitivity setting unit may set the sensitivity parameter by controlling at least one of a quantity of light emitted from the light source, an attenuation amount of the light in the optical system, and a gain of the light receiving element. In this case, the sensitivity parameter is automatically set by the sensitivity setting unit.

(5) The sensitivity setting unit may preferentially control the quantity of the light emitted from the first light source or the attenuation amount of the light in the optical system over the gain of the light receiving element when changing the sensitivity parameter from the first value to the second value.

In this case, the increase in the noise level is prevented by the increase in the gain of the light receiving element. Therefore, the sensitivity parameter can be changed to an appropriate second value without increasing the noise level.

(6) The sensitivity setting unit may determine the second value of the sensitivity parameter at the time of the second measurement based on the image data generated at the time of the first measurement.

Thus, the second value of the sensitivity parameter at the time of the second measurement can be appropriately set based on the image data generated at the time of the first measurement.

(7) A surface state observing method according to another embodiment of the present invention relates to a surface state observing method used in a microscope system for observing a state of a surface of an observing target, the method including the steps of emitting a light from a light source; irradiating the light emitted from the light source on the observing target while collecting the light by an optical system, and guiding the light irradiated on the observing target to a light receiving element; outputting pixel data corresponding to a plurality of pixels based on an output signal of the light receiving element; setting a sensitivity parameter for adjusting a value of the pixel data by controlling at least one of the light source, the optical system, or the light receiving element; carrying out a first measurement for generating image data for every pixel indicating a state of a surface of the observing target based on the pixel data output with the sensitivity parameter set to a first value; generating a determination value for determining whether or not to carry out the second measurement based on the image data generated at the time of the first measurement, and determining whether or not a result of the first measurement satisfies a condition defined in advance based on the generated determination value; and carrying out a second measurement for generating image data for every pixel indicating a state of a surface of the observing target based on the pixel data output with the sensitivity parameter set to a second value greater than the first value if the result of the first measurement does not satisfy the condition and generating surface image data indicating a state of the surface of the observing target by synthesizing the image data generated at the time of the first measurement and the image data generated at the time of the second measurement, and not carrying out the second measurement if the result of the first measurement satisfies the condition and generating the surface image data based on the image data generated at the time of the first measurement.

In the surface state observing method, the light emitted from the light source is irradiated on the observing target while being collected by the optical system, and the light irradiated on the observing target is guided to the light receiving element. The pixel data corresponding to a plurality of pixels is output based on an output signal of the light receiving element.

The first measurement for generating the image data for every pixel is carried out with the sensitivity parameter set to the first value. The determination value for determining whether or not to carry out the second measurement is generated based on the image data generated at the time of the first measurement. Whether or not a result of the first measurement satisfies a condition defined in advance is determined based on the generated determination value.

If the result of the first measurement does not satisfy the condition, the second measurement for generating the image data for every pixel is carried out with the sensitivity parameter set to the second value. The image data is thus generated with different sensitivity parameters according to the state of the surface of the observing target. The surface image data is generated by synthesizing the image data generated at the time of the first measurement and the image data generated at the time of the second measurement. Thus, the state of the surface of the observing target can be accurately observed even when the state of the surface of the observing target differs for every region.

If the result of the first measurement satisfies the condition, the second measurement is not carried out and the surface image data is generated based on the image data generated at the time of the first measurement. Thus, the surface image data indicating the state of the surface of the observing target is generated in one measurement, so that the surface image data can be generated in a short time without carrying out the synthesizing process.

According to the above results, the user can accurately observe the state of the surface of the observing target in a short time without carrying out the troublesome task.

(8) A surface state observing program according to another further embodiment of the present invention relates to a surface state observing program for causing a processing device to execute a surface state observing process used in a microscope system for observing a state of a surface of an observing target, the program causing the processing device to execute processes of emitting a light from a light source; irradiating the light emitted from the light source on the observing target while collecting the light by an optical system, and guiding the light irradiated on the observing target to a light receiving element; outputting pixel data corresponding to a plurality of pixels based on an output signal of the light receiving element; setting a sensitivity parameter for adjusting a value of the pixel data by controlling at least one of the light source, the optical system, or the light receiving element; carrying out a first measurement for generating image data for every pixel indicating a state of a surface of the observing target based on the pixel data output with the sensitivity parameter set to a first value; generating a determination value for determining whether or not to carry out the second measurement based on the image data generated at the time of the first measurement, and determining whether or not a result of the first measurement satisfies a condition defined in advance based on the generated determination value; and carrying out a second measurement for generating image data for every pixel indicating a state of a surface of the observing target based on the pixel data output with the sensitivity parameter set to a second value greater than the first value if the result of the first measurement does not satisfy the condition and generating surface image data indicating a state of the surface of the observing target by synthesizing the image data generated at the time of the first measurement and the image data generated at the time of the second measurement, and not carrying out the second measurement if the result of the first measurement satisfies the condition and generating the surface image data based on the image data generated at the time of the first measurement.

In the surface state observing program, the light emitted from the light source is irradiated on the observing target while being collected by the optical system, and the light irradiated on the observing target is guided to the light receiving element. The pixel data corresponding to a plurality of pixels is output based on an output signal of the light receiving element.

The first measurement for generating the image data for every pixel is carried out with the sensitivity parameter set to the first value. The determination value for determining whether or not to carry out the second measurement is generated based on the image data generated at the time of the first measurement. Whether or not a result of the first measurement satisfies a condition defined in advance is determined based on the generated determination value.

If the result of the first measurement does not satisfy the condition, the second measurement for generating the image data for every pixel is carried out with the sensitivity parameter set to the second value. The image data is thus generated with different sensitivity parameters according to the state of the surface of the observing target. The surface image data is generated by synthesizing the image data generated at the time of the first measurement and the image data generated at the time of the second measurement. Thus, the state of the surface of the observing target can be accurately observed even when the state of the surface of the observing target differs for every region.

If the result of the first measurement satisfies the condition, the second measurement is not carried out and the surface image data is generated based on the image data generated at the time of the first measurement. Thus, the surface image data indicating the state of the surface of the observing target is generated in one measurement, so that the surface image data can be generated in a short time without carrying out the synthesizing process.

According to the above results, the user can accurately observe the state of the surface of the observing target in a short time without carrying out the troublesome task.

According to the present invention, the user can accurately observe the state of the surface of the observing target in a short time without carrying out the troublesome task.

DETAILED DESCRIPTION OF PREFERRED EMBODIMENTS

A microscope system, a surface state observing method, and a surface state observing program according to one embodiment of the present invention will be described with reference to the drawings. Hereinafter, a confocal microscope system will be described as an example of the microscope system.

(1) Basic Configuration of Confocal Microscope System

Figure 1:
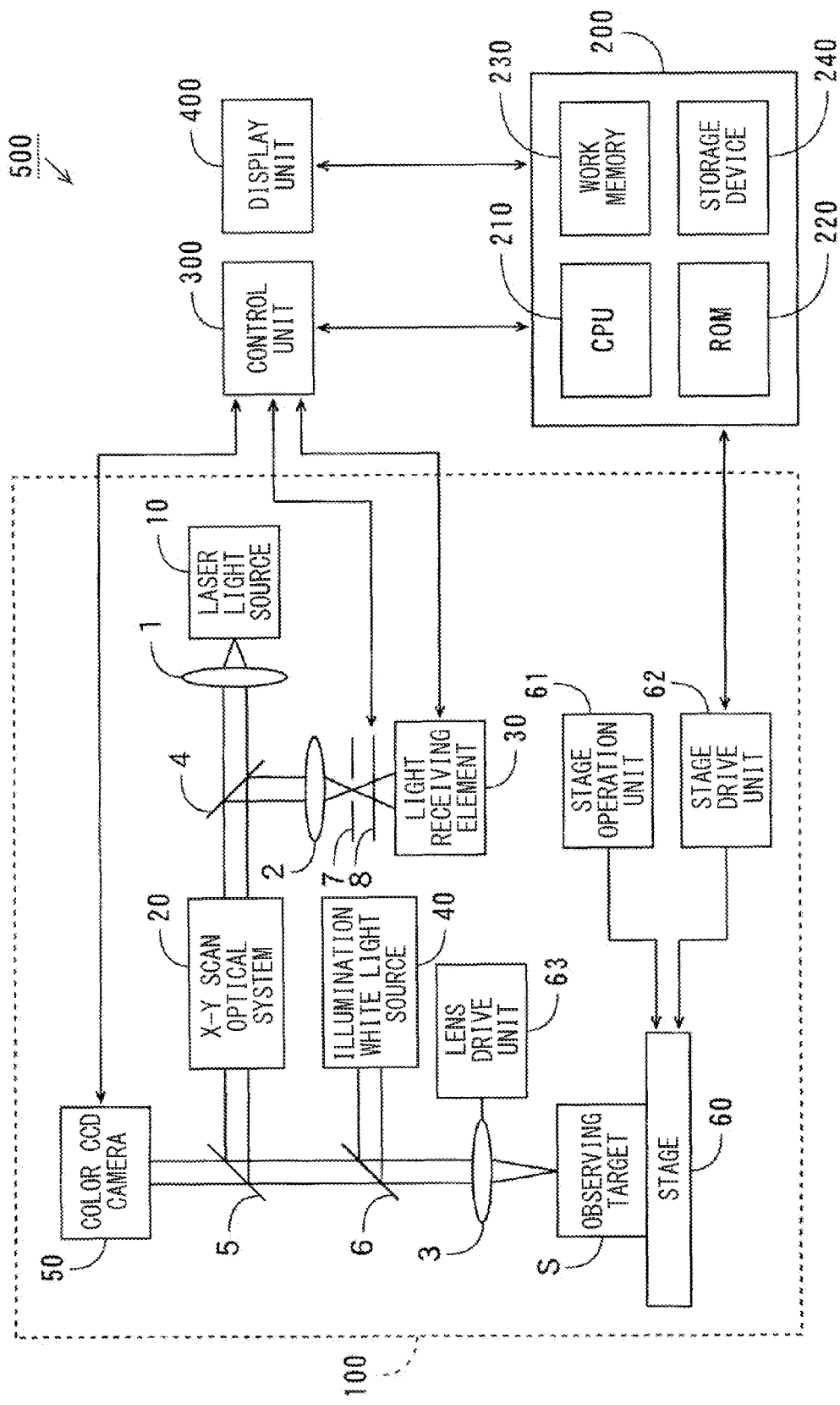
FIG. 1 is a block diagram showing a configuration of a confocal microscope system according to one embodiment of the present invention.

FIG. 1 is a block diagram showing a configuration of a confocal microscope system 500 according to one embodiment of the present invention. As shown in FIG. 1, the confocal microscope system 500 includes a measurement unit 100, a PC (Personal Computer) 200, a control unit 300, and a display unit 400. The measurement unit 100 includes a laser light source 10, an X-Y scan optical system 20, a light receiving element 30, an illumination white light source 40, a color CCD (Charge Coupled Device) camera 50, and a stage 60. An observing target S is mounted on the stage 60.

The laser light source 10 is a semiconductor laser, for example. The laser light emitted from the laser light source 10 is converted to a parallel light by the lens 1, and then transmitted through the half mirror 4 to enter the X-Y scan optical system 20. Other light sources such as a mercury lamp may be used instead of the laser light source 10. In this case, a bandpass filter is arranged between the light source such as the mercury lamp and the X-Y scan optical system 20. The light emitted from the light source such as the mercury lamp becomes a monochromatic light by passing through the bandpass filter, and then entered to the X-Y scan optical system 20.

The X-Y scan optical system 20 is, for example, a galvano mirror. The X-Y scan optical system 20 has a function of scanning the laser light in the X direction and the Y direction on the surface of the observing target S on the stage 60. The definition of the X direction, the Y direction, and the Z direction will be made later. The laser light scanned by the X-Y scan optical system 20 is reflected by a half mirror 5, and then transmitted through a half mirror 6, and collected on the observing target S on the stage 60 by an objective lens 3. A polarized beam splitter may be used in place of the half mirrors 4 to 6.

The laser light reflected by the observing target S is transmitted through the objective lens 3 and the half mirror 6, and then reflected by the half mirror 5 and transmitted through the X-Y scan optical system 20. The laser light transmitted through the X-Y scan optical system 20 is reflected by the half mirror 4, collected by the lens 2, and transmitted through a pin hole of a pin hole member 7 and an ND (Neutral Density) filter 8 to enter a light receiving element 30. Thus, a reflective confocal microscope system 500 is used in the present embodiment, but a transmissive confocal microscope system may be used when the observing target S is a transparent body such as a cell.

The pin hole of the pin hole member 7 is arranged at a focus position of the lens 2. The ND filter 8 is used to attenuate the intensity of the laser light entering the light receiving element 30. Thus, the ND filter 8 does not need to be arranged if the intensity of the laser light is sufficiently attenuated.

In the present embodiment, the light receiving element 30 is a photomultiplier. A photodiode and an amplifier may be used for the light receiving element 30. The light receiving element 30 outputs an analog electric signal (hereinafter referred to as light receiving signal) corresponding to the light receiving quantity. The control unit 300 includes two A/D converters (analog/digital converter), a FIFO (First In First Out) memory, and a CPU (Central Processing Unit). The light receiving signal output from the light receiving element 30 is sampled at a constant sampling period and converted to a digital signal by one A/D converter of the control unit 300. The digital signal output from the A/D converter is sequentially accumulated in the FIFO memory. The digital signal accumulated in the FIFO memory is sequentially transferred to the PC 200 as pixel data.

The illumination white light source 40 is, for example, a halogen lamp or a white LED (light emitting diode). The white light generated by the illumination white light source 40 is reflected by the half mirror 6, and then collected on the observing target S on the stage 60 by the objective lens 3.

The white light reflected by the observing target S is transmitted through the objective lens 3, the half mirror 6, and the half mirror 5, and entered to the color CCD camera 50. An imaging element such as a CMOS (Complementary Metal Oxide Semiconductor) image sensor may be used in place of the color CCD camera 50. The color CCD camera 50 outputs an electric signal corresponding to the light receiving quantity. The output signal of the color CCD camera 50 is sampled at a constant sampling period and converted to a digital signal by the other A/D converter of the control unit 300. The digital signal output from the A/D converter is sequentially transferred to the PC 200 as camera data.

The control unit 300 provides the pixel data and the camera data to the PC 200, and controls the attenuation rate of the laser light by the ND filter 8, the gain (light receiving sensitivity) of the light receiving element 30, and the color CCD camera 50 based on a command from the PC 200. The control unit 300 controls the X-Y scan optical system 20 based on the command from the PC 200 to scan the laser light in the X direction and the Y direction on the observing target S.

The objective lens 3 is arranged to be movable in the Z direction by a lens drive unit 63. The control unit 300 controls the lens drive unit 63 based on a command from the PC 200 to move the objective lens 3 in the Z direction. The relative position in the Z direction of the observing target S with respect to the objective lens 3 then can be changed.

The PC 200 includes a CPU (Central Processing Unit) 210, a ROM (Read Only Memory) 220, a work memory 230, and a storage device 240. The ROM 220 stores a system program. The work memory 230 includes a RAM (Random Access Memory) and is used for the processing of various data. The storage device 240 includes a hard disc, and the like. The storage device 240 stores a surface state observing program, and is used to save various data such as the pixel data and the camera data provided from the control unit 300. The details of the surface state observing program will be described later.

The CPU 210 generates image data based on the pixel data provided from the control unit 300. Hereinafter, the image data generated based on the pixel data is referred to as confocal image data. An image displayed based on the confocal image data is referred to as a confocal image.

The CPU 210 generates image data based on the camera data provided from the control unit 300. Hereinafter, the image data generated based on the camera data is referred to as camera image data. An image displayed based on the camera image data is referred to as a camera image.

The CPU 210 carries out various types of processing using the task memory 230 on the generated confocal image data and camera image data, and causes the display unit 400 to display the confocal image based on the confocal image data and the camera image based on the camera image data. The CPU 210 provides a drive pulse to a stage drive unit 62, to be described later.

The display unit 400 is configured, for example, by a liquid crystal display panel or an organic EL (Electro Luminescence) panel.

The stage 60 has an X direction movement mechanism, a Y direction movement mechanism, and a Z direction movement mechanism. A stepping motor is used for the X direction movement mechanism, the Y direction movement mechanism, and the Z direction movement mechanism.

The X direction movement mechanism, the Y direction movement mechanism, and the Z direction movement mechanism of the stage 60 are driven by a stage operation unit 61 and the stage drive unit 62. The user manually operates the stage operation unit 61 to move the stage 60 relatively in the X direction, the Y direction, and the Z direction with respect to the objective lens 3.

The stage drive unit 62 supplies current to the stepping motor of the stage 60 based on the drive pulse provided by the PC 200 to move the stage 60 relatively in the X direction, the Y direction, or the Z direction with respect to the objective lens 3.

(2) Confocal Image, Ultradeep Image, and Height Image

Figure 2:
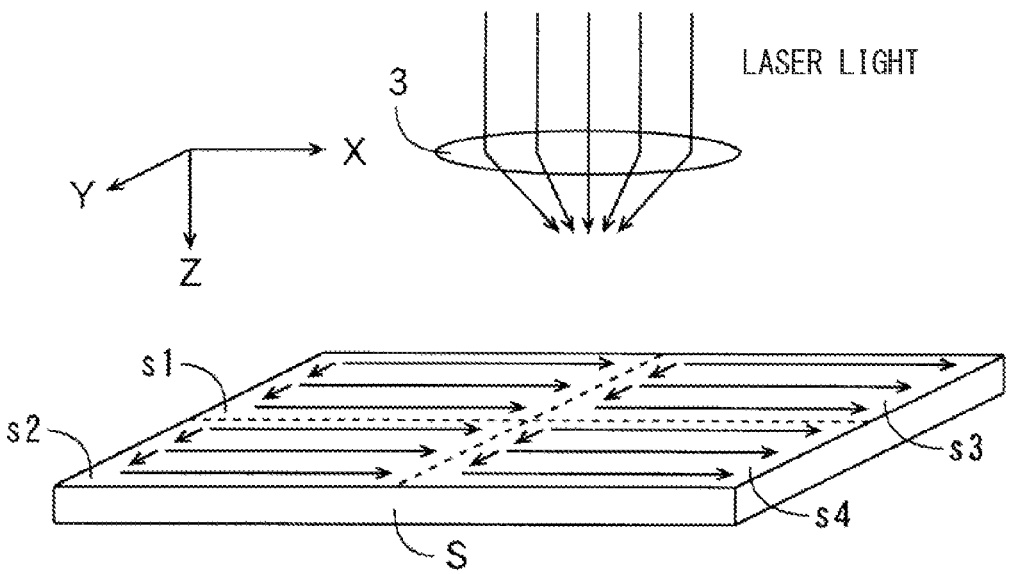
FIG. 2 is a view for defining an X direction, a Y direction, and a Z direction.

FIG. 2 is a view for defining the X direction, the Y direction, and the Z direction. As shown in FIG. 2, the laser light collected by the objective lens 3 is irradiated on the observing target S. In the present embodiment, the direction of the optical axis of the objective lens 3 is defined as the Z direction. In a plane orthogonal to the Z direction, two directions orthogonal to each other are respectively defined as the X direction and the Y direction. The X direction, the Y direction, and the Z direction are respectively shown with arrows X, Y, Z.

The relative position of the surface of the observing target S with respect to the objective lens 3 in the Z direction is referred to as a position in the Z direction of the observing target S. The confocal image data is generated for every unit region. The unit region is defined by the magnification of the objective lens 3.

The laser light is scanned in the X direction at the end in the Y direction in the unit region by the X-Y scan optical system 20 with the position in the Z direction of the observing target S constant. After the scanning in the X direction is finished, the laser light is shifted by a constant interval in the Y direction by the X-Y scan optical system 20. The laser light is scanned in the X direction in such state. The scanning in the X direction and the Y direction of the unit region is finished by repeating the scanning in the X direction and the shift in the Y direction of the laser light in the unit region. The objective lens 3 is then moved in the Z direction. The scanning in the X direction and the Y direction of the unit region is thereby carried out in a constant state in which the position in the Z direction of the objective lens 3 differs from the previous time. The scanning in the X direction and the Y direction of the unit region is carried out at a plurality of positions in the Z direction of the observing target S.

The confocal image data is generated by the scanning in the X direction and the Y direction for every position in the Z direction of the observing target S. A plurality of confocal image data in which the position in the Z direction differs in the unit region is thereby generated.

The number of pixels in the X direction of the confocal image data is defined by the scanning speed in the X direction of the laser light by the X-Y scan optical system 20 and the sampling period of the control unit 300. The number of sampling in one scanning (one scanning line) in the X direction becomes the number of pixels in the X direction. The number of pixels in the Y direction of the confocal image data of the unit region is defined by the amount of shift in the Y direction of the laser light by the X-Y scan optical system 20 every time the scanning in the X direction is finished. The number of scanning lines in the Y direction becomes the number of pixels in the Y direction. The number of confocal image data of the unit region is defined by the number of movements of the objective lens 3 in the Z direction. The ultradeep image data and the height image data are generated through a method, to be described later, based on the plurality of confocal image data of the unit region.

In the example of FIG. 2, a plurality of confocal image data of the observing target S in a unit region s1 is generated and the ultradeep image data and the height image data of the unit region s1 are generated at a first position of the stage 60. Then, the stage 60 is sequentially moved, so that the plurality of confocal image data of the observing target S in unit regions s2 to s4 and the ultradeep image data and the height image data of the unit regions s2 to s4 are generated. In this case, the unit regions s1 to s4 may be set so that one part of the adjacent unit regions overlap each other. Thus, the ultradeep image data and the height image data of the plurality of unit regions s1 to s4 can be coupled at high accuracy by performing pattern matching. In particular, if the total area of the plurality of unit regions is greater than an acquiring range of the pixel data, to be described later, the portion corresponding to the area of the portion running out from the acquiring range is set as the overlapping portion.

Figure 3:
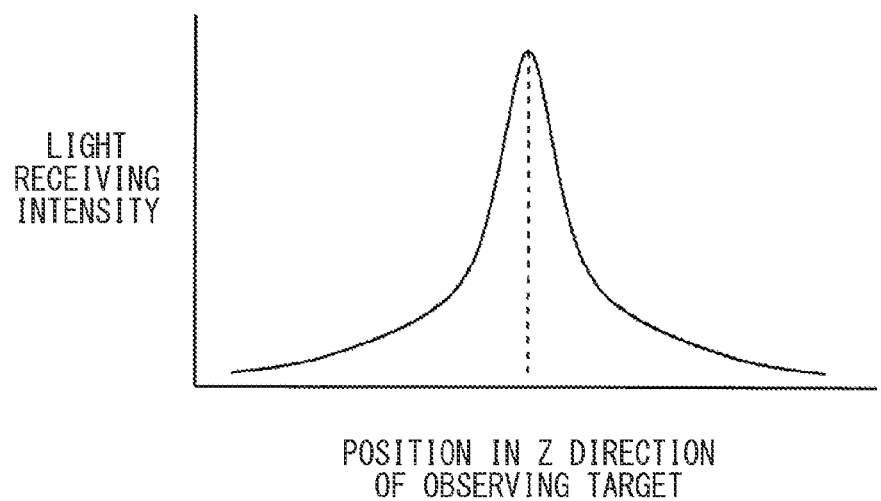
FIG. 3 is a view showing a relationship of a position in a Z direction of the observing target and the light receiving intensity of the light receiving element for one pixel.

FIG. 3 is a view showing a relationship of the position in the Z direction of the observing target S and the light receiving intensity of the light receiving element 30 for one pixel. As shown in FIG. 1, the pin hole of the pin hole member 7 is arranged at the focus position of the lens 2. Thus, if the surface of the observing target S is at the focus position of the objective lens 3, the laser light reflected by the observing target S is collected at the position of the pin hole of the pin hole member 7. Thus, the majority of the laser light reflected by the observing target S is passed through the pin hole of the pin hole member 7 to enter the light receiving element 30. In this case, the light receiving intensity of the light receiving element 30 becomes a maximum. The voltage value of the light receiving signal output from the light receiving element 30 thus becomes a maximum.

If the surface of the observing target S is at a position the focus position of the objective lens 3 is deviated, the laser light reflected by the observing target S is collected at the position front or back of the pin hole of the pin hole member 7. Thus, most of the laser light reflected by the observing target S is shielded at the peripheral portion of the pin hole of the pin hole member 7, and the light receiving intensity of the light receiving element 30 lowers. The voltage value of the light receiving signal output from the light receiving element 30 thus lowers.

Therefore, a peak appears in the distribution of the light receiving intensity of the light receiving element 30 with the surface of the observing target S at the focus position of the objective lens 3. The distribution of the light receiving intensity in the Z direction is obtained for every pixel from the plurality of confocal image data of each unit region. Thus, the peak position and the peak intensity (light receiving intensity of peak) of the light receiving intensity distribution are obtained for every pixel.

The data representing the peak position in the Z direction for a plurality of pixels of each unit region is referred to as a height image data, and the image displayed based on the height image data is referred to as a height image. The height image represents the surface shape of the observing target S. The data representing the peak intensity for a plurality of pixels of each unit region is referred to as an ultradeep image data, and the image displayed based on the ultradeep image data is referred to as an ultradeep image. The ultradeep image is an image obtained with the focus of the objective lens 3 on all the portions of the surface of the observing target S. The PC 200 generates a plurality of confocal image data of the unit region based on a plurality of pixel data of the unit region provided from the control unit 300, and generates the height image data and the ultradeep image data of the unit region based on a plurality of confocal image data.

(3) Relationship of Peak Intensity and Shape of Observing Target

Figure 4:
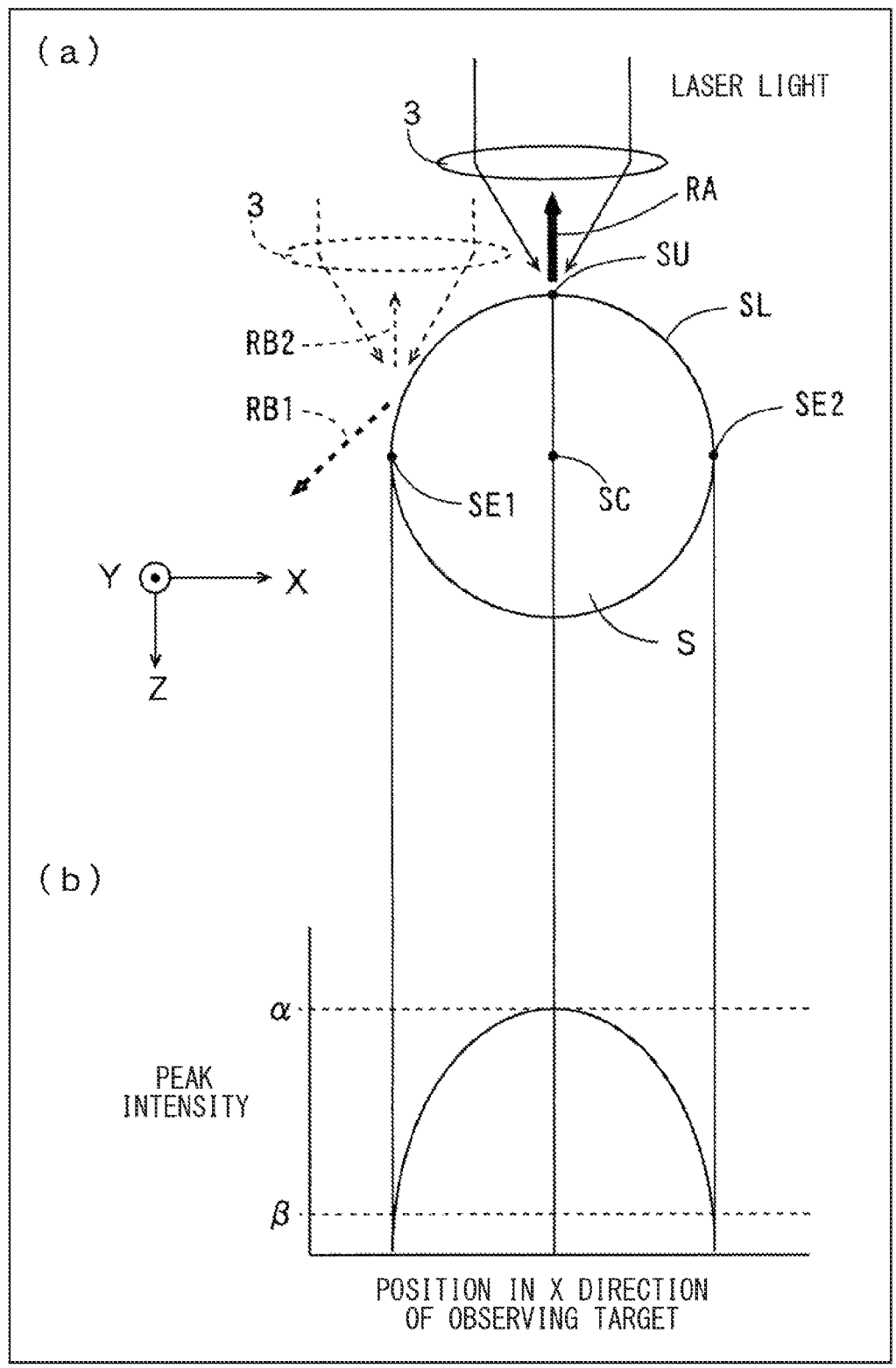
FIGS. 4A and 4B are views for describing the relationship of the peak intensity and the shape of the observing target.

FIGS. 4A and 4B are views for describing the relationship of the peak intensity and the shape of the observing target S. As shown in FIG. 4A, the observing target S having a circular column shape is arranged such that the center axis SC of the observing target S is parallel to the Y direction. The height image data and the ultradeep image data on a line SL along the peripheral direction of the outer peripheral surface on the upper side of the observing target S are generated in such state.

An upper end portion SU of the outer peripheral surface of the observing target S is substantially parallel to the XY plane. When the upper end portion SU is at the focus position of the objective lens 3, substantially all the laser light collected at the focus position is reflected towards the objective lens 3, transmitted through the objective lens 3, and entered to the light receiving element 30, as shown with a thick arrow RA in FIG. 4A.

Both side end portions SE1, SE2 of the outer peripheral surface of the observing target S are substantially perpendicular to the XY plane. When the portion in the vicinity of the side end portions SE1, SE2 is at the focus position of the objective lens 3, substantially all the laser light collected at the focus position is reflected towards the side of the observing target S, as shown with a thick arrow RB1 in FIG. 4A. Thus, most of the laser light reflected at the vicinity of the side end portions SE1, SE2 is not transmitted through the objective lens 3 and is barely entered to the light receiving element 30, as shown with a dotted line arrow RB2 in FIG. 4A.

As described above, when the intensity of the laser light collected at the observing target S is constant, the light receiving intensity of the light receiving element 30 becomes larger as the focus position of the objective lens 3 approaches the upper end portion SU of the observing target S, and becomes smaller as the focus position of the objective lens 3 approaches the side end portions SE1, SE2 of the observing target S.

FIG. 4B shows the relationship of the peak intensity and the position in the X direction of the observing target S. As shown in FIG. 4B, a value β of the peak intensity by the laser light reflected in the vicinity of the side end portions SE1, SE2 of the observing target S is sufficiently small with respect to a value a of the peak intensity by the laser light reflected at the upper end portion SU of the observing target S.

The height image data and the ultradeep image data are generated based on the plurality of pixel data acquired when the laser light is scanned in the X direction and the Y direction at a plurality of positions in the Z direction of the observing target S. The value of the pixel data acquired with the focus position of the objective lens 3 on the surface of the observing target S is acquired as the value of the peak intensity.

The pixel data is a digital signal corresponding to the light receiving signal output from the light receiving element 30. The pixel data is output from the A/D converter of the control unit 300. Therefore, the upper limit value of the pixel data is the upper limit value (hereinafter referred to as output upper limit value max) of the output range of the A/D converter.

In the confocal microscope system according to the present embodiment, the sensitivity parameter can be changed. The sensitivity parameter is the parameter for adjusting the value of the pixel data to be acquired by the control unit 300 with the state (reflectivity, direction, roughness, color, etc.) of the surface of the observing target S under a constant condition.

The value of the pixel data is greater the greater the light quantity of the laser light source 10 and smaller the smaller the light quantity of the laser light source 10. The value of the image data is smaller the greater the attenuation rate of the laser light by the ND filter 8, and greater the smaller the attenuation rate of the laser light by the ND filter 8. Furthermore, the value of the pixel data is greater the higher the gain of the light receiving element 30, and smaller the lower the gain of the light receiving element 30. Therefore, the sensitivity parameter can be changed by controlling at least one of the light quantity of the laser light source 10, the attenuation rate of the laser light by the ND filter 8, and the gain of the light receiving element 30.

When the sensitivity parameter is set high with the state of the surface of the observing target S under a constant condition, the level of the light receiving signal output from the light receiving element 30 becomes high and the value of the pixel data acquired by the control unit 300 becomes large. When the sensitivity parameter is set low with the state of the surface of the observing target S under a constant condition, the level of the light receiving signal output from the light receiving element 30 becomes low and the value of the pixel data acquired by the control unit 300 becomes small.

If the sensitivity parameter is too high, the level of the light receiving signal output from the light receiving element 30 might saturate, and the value of the pixel data acquired by the control unit 300 might saturate at the upper limit value max. For instance, if the value of the acquired pixel data is saturated at the output upper limit value max when the focus position of the objective lens 3 is on the pixel of the upper end portion SU of the observing target S of FIG. 4A, the peak intensity and the peak position at the relevant pixel cannot be acquired. In the present embodiment, the sensitivity parameter is set such that the values of the plurality of pixel data acquired to generate the height image data and the ultradeep image data become smaller than the output upper limit value max.

If the sensitivity parameter is too low, the level of the light receiving signal output from the light receiving element 30 becomes lower than or equal to the noise level, and the value of the pixel data acquired by the control unit 300 might become lower than or equal to the digital value (hereinafter referred to as noise level n1) of the noise output from the light receiving element 30. For instance, if the value of the acquired pixel data corresponding to the pixel in the vicinity of the side end portions SE1, SE2 of FIG. 4A is lower than or equal to the noise level n1, the peak of the pixel data corresponding to the pixel in the vicinity of the side end portions SE1, SE2 cannot be clearly identified from the noise of the light receiving element 30. Thus, the wide dynamic range process is carried out in the present embodiment. The wide dynamic range process will be described below.

(4) Wide Dynamic Range Process

Figure 5:
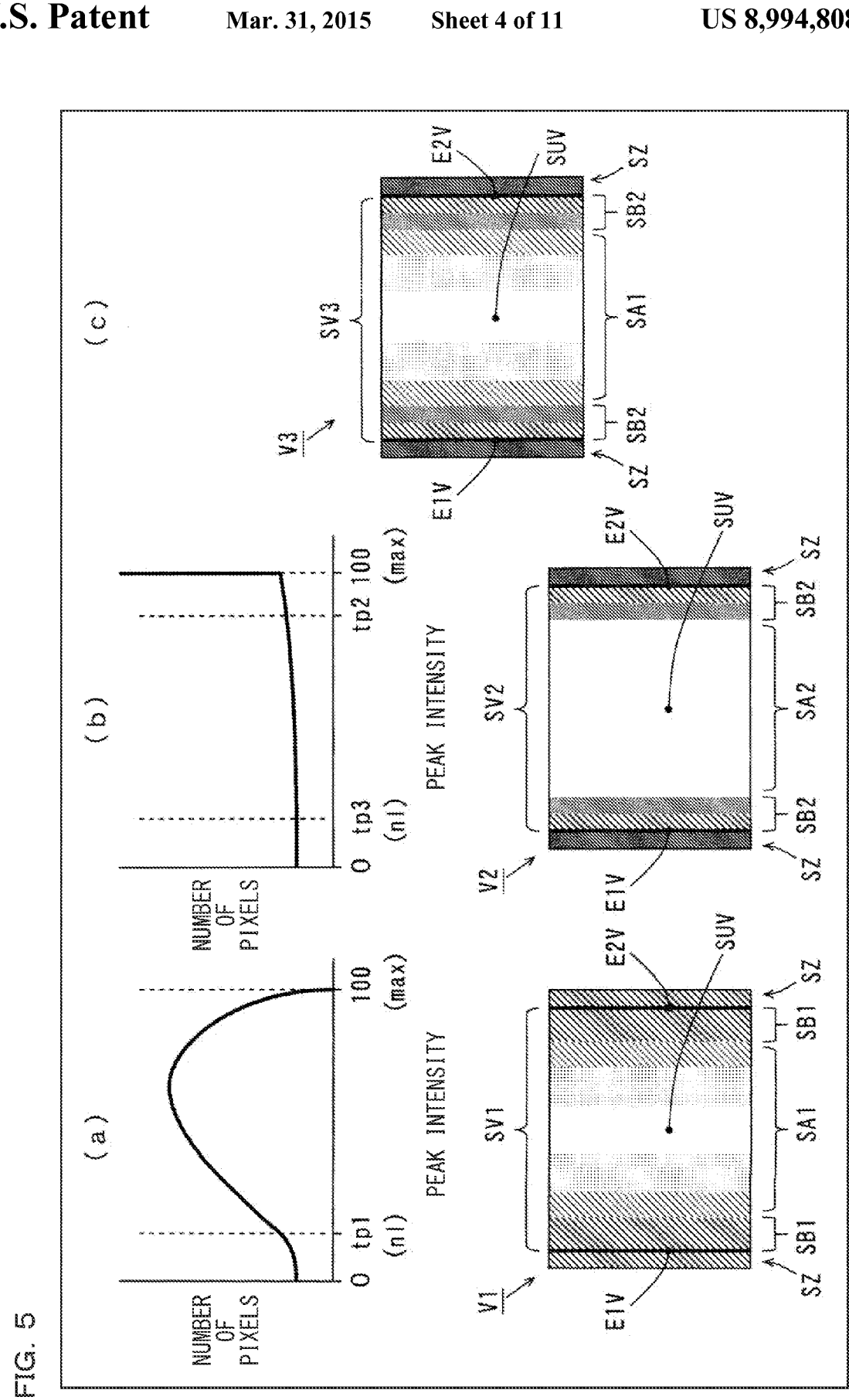
FIGS. 5A to 5C are views for describing a wide dynamic range process.

FIGS. 5A to 5C are views for describing the wide dynamic range process. In the wide dynamic range process, the sensitivity parameter is first set such that the values of the plurality of pixel data that are acquired become smaller than the output upper limit value max. In the following, the value of the sensitivity parameter set first after the start of the wide dynamic range process is referred to as a first sensitivity value.

Specifically, the pixel data corresponding to all the pixels in the unit region are first acquired by carrying out the scanning in the X direction and the Y direction of the unit region with the objective lens 3 held at an arbitrary position in the Z direction. In such a state, if the value of one of the pixel data is the output upper limit value max, the attenuation rate of the laser light by the ND filter 8 is increased by a constant amount to reduce the sensitivity parameter. Alternatively, the light quantity of the laser light source 10 or the gain of the light receiving element 30 is reduced by a constant amount to reduce the sensitivity parameter. Thereafter, the scanning in the X direction and the Y direction of the unit region is again carried out to acquire the pixel data corresponding to all the pixels in the unit region.

The objective lens 3 is moved in the Z direction by a constant amount when the value of all the pixel data becomes smaller than the output upper limit value max by repeating the reduction of the sensitivity parameter and the acquisition of the pixel data. Then, the reduction of the sensitivity parameter, the acquisition of the pixel data, the determining operation of the pixel data, and the movement of the objective lens 3 in the Z direction are repeated. The value of the sensitivity parameter set when the objective lens 3 completed the movement of the entire range of the Z direction defined in advance is ultimately stored in the work memory 230 of FIG. 1 as a first sensitivity value. The first sensitivity value is automatically set in such manner (automatic setting of first sensitivity value).

In the above description, the first sensitivity value is set while carrying out the scanning in the X direction and the Y direction of the unit region at a plurality of positions in the Z direction of the observing target S and acquiring a plurality of pixel data. This is not the sole case, and the first sensitivity value may be set when the user operates a pointing device such as a mouse connected to the PC 200 (manual setting of first sensitivity value). An example in which the user sets the first sensitivity value will be described later.

The scanning in the X direction and the Y direction of the unit region is carried out at a plurality of positions in the Z direction of the observing target S with the first sensitivity value set. The plurality of pixel data is thereby acquired, and a plurality of confocal image data in which the position in the Z direction differs in the unit region is generated. The height image data and the ultradeep image data of the unit region are generated based on the plurality of confocal image data.

At the time of the generation of the height image data and the ultradeep image data, the peak value of the pixel data corresponding to each pixel is detected as the peak intensity. The relative position in the Z direction of the observing target S with respect to the objective lens 3 of when each extracted peak intensity is acquired is detected as the peak position.

A histogram indicating a relationship of the peak intensity acquired with the first sensitivity value and the number of pixels is shown on the upper stage of FIG. 5A. In this histogram, the vertical axis indicates the number of pixels, and the horizontal axis indicates the peak intensity (peak value of pixel data for every pixel). On the horizontal axis, the maximum value (100) of the peak intensity corresponds to the output upper limit value max of the A/D converter.

An ultradeep image V1 based on the ultradeep image data generated using the first sensitivity value is shown on the lower stage of FIG. 5A. The ultradeep image V1 includes an image SV1 showing the outer peripheral surface on the upper side of the observing target S. The pixel at substantially the middle portion SUV of the image SV1 corresponds to the pixel of the upper end portion SU of FIG. 4A, and the pixels of both sides E1V, E2V of the image SV1 correspond to the pixels of both side end portions SE1, SE2 of FIG. 4A.

On the horizontal axis of FIG. 5A, a value tp1 of the peak intensity corresponds to the noise level n1 of when the first sensitivity value is set as the sensitivity parameter. The value tp1 of the peak intensity is, for example, three.

In this case, the pixel data of smaller than or equal to the value tp1 cannot be identified from the noise of the light receiving element 30. Thus, there is a possibility the noise of the light receiving element 30 may be detected as the peak intensity at smaller than or equal to the value tp1. Therefore, accurate peak intensity and peak position cannot be acquired at smaller than or equal to the value tp1.

In the ultradeep image V1 of FIG. 5A, the surface of the observing target S is clearly shown with a contrast of plural levels in the region SA1 of the middle part of the image SV1 and the vicinity thereof. The region SB1 of a constant width along both sides of the image SV1 and the region SZ other than the image SV1 are shown with substantially the same concentration (dark hatching). Thus, in the regions SB1, SZ where only the pixel data of low value can be acquired, the concentration of the image is uniformized over a wide range as the noise of the light receiving element 30 is detected as the peak intensity. In this case, the boundary of the image SV1 and the region SZ other than the image SV1 cannot be identified.

Thus, after the height image data and the ultradeep image data of the unit region are generated with the first sensitivity value, the number of pixels in which the peak intensity is smaller than or equal to the value tp1 is detected, and the detected number of pixels is divided by the total number of pixels in the unit region. The divided value calculated in such manner is referred to as an invalid pixel ratio. In this case, the number of pixel data having a peak that cannot be identified from the noise of the light receiving element 30 is greater the larger the invalid pixel ratio, and the number of pixel data having a peak that cannot be identified from the noise of the light receiving element 30 is smaller the smaller the invalid pixel ratio.

In the wide dynamic range process, a reference pixel ratio is stored in advance in the storage device 240 of FIG. 1. Whether or not the calculated invalid pixel ratio is smaller than or equal to the reference pixel ratio is then determined.

If the invalid pixel ratio is greater than the reference pixel ratio, at least one of the light quantity of the laser light source 10, the attenuation rate of the laser light by the ND filter 8, or the gain of the light receiving element 30 is controlled to change the sensitivity parameter to a second sensitivity value higher than the first sensitivity value.

The scanning in the X direction and the Y direction of the unit region is carried out at a plurality of positions in the Z direction of the observing target S with the second sensitivity value set. A plurality of pixel data is thereby acquired, and a plurality of confocal image data in which the position in the Z direction differs in the unit region is generated. The height image data and the ultradeep image data of the unit region are generated based on the plurality of confocal image data.

A histogram indicating a relationship of the peak intensity acquired with the second sensitivity value and the number of pixels is shown on the upper stage of FIG. 5B. In this histogram, the vertical axis indicates the number of pixels, and the horizontal axis indicates the peak intensity (peak value of pixel data for every pixel). On the horizontal axis, the maximum value (100) of the peak intensity corresponds to the output upper limit value max of the A/D converter.

An ultradeep image V2 based on the ultradeep image data generated using the second sensitivity value is shown on the lower stage of FIG. 5B. The ultradeep image V2 includes an image SV2 showing the outer peripheral surface on the upper side of the observing target S. The pixel at substantially the middle portion SUV of the image SV2 corresponds to the pixel of the upper end portion SU of FIG. 4A, and the pixels of both sides E1V, E2V of the image SV2 correspond to the pixels of both side end portions SE1, SE2 of FIG. 4A.

On the horizontal axis of FIG. 5B, a value tp2 of the peak intensity is a multiplied value of a ratio (=second sensitivity value/first sensitivity value) of the second sensitivity value with respect to the first sensitivity value and the value tp1 of FIG. 5A. The value tp2 of the peak intensity is, for example, 97. Therefore, the second sensitivity value is set so that the value tp2 of the peak intensity is slightly smaller than the maximum value (100) of the peak intensity.

The second sensitivity value may be set by reducing the attenuation rate of the laser light by the ND filter 8 of when the first sensitivity value is set by a constant amount defined in advance, or may be set by increasing the light quantity of the laser light source 10 or the gain of the light receiving element 30 of when the first sensitivity value is set by a constant amount defined in advance.

When changing the sensitivity parameter from the first sensitivity value to the second sensitivity value, the attenuation rate of the laser light by the ND filter 8 or the light quantity of the laser light source 10 is preferably controlled preferentially over the gain of the light receiving element 30.

When controlling the attenuation rate of the laser light by the ND filter 8 or the light quantity of the laser light source 10, the magnitude of the noise level n1 barely changes at before and after the change of the sensitivity parameter. Therefore, the noise level n1 is prevented from increasing when the sensitivity parameter is changed from the first sensitivity value to the second sensitivity value.

On the horizontal axis of FIG. 5B, the value tp3 of the peak intensity corresponds to the noise level n1 of when the second sensitivity value is set for the sensitivity parameter. The value tp3 of the peak intensity is, for example, three.

As shown on the upper stage of FIG. 5B, the peak intensity corresponding to a great number f pixels is saturated at the maximum value (100) if the second sensitivity value is set as the sensitivity parameter. If the second sensitivity value is set as the sensitivity parameter, the value tp3 of the peak intensity corresponding to the noise level n1 becomes sufficiently smaller than the value tp2 of the peak intensity. The peak intensity of a value greater than the noise level n1 thus can be obtained at the second sensitivity value for the pixel having a peak intensity smaller than or equal to the noise level n1 at the first sensitivity value.

In the ultradeep image V2 of FIG. 5B, the surface of the observing target S is shown with a constant concentration (white) in the region SA2 of the middle part of the image SV2 and the vicinity thereof, and the region SB2 of a constant width along both sides of the image SV2 and the region SZ other than the image SV2 are clearly shown with a contrast of plural levels.

Thus, after the ultradeep image data of the unit region is generated with the first sensitivity value and the ultradeep image data of the unit region is generated with the second sensitivity value, the two ultradeep image data are synthesized. The ultradeep image data generated with the first sensitivity value is referred to as first ultradeep image data, and the ultradeep image data generated with the second sensitivity value is, referred to as second ultradeep image data.

First, the data (region SB1 of FIG. 5A) of the portion corresponding to the pixel having a peak intensity of smaller than or equal to the value tp1 of the first ultradeep image data of the unit region is deleted. The data (region SA2 of FIG. 5B) of the portion corresponding to the pixel having a peak intensity of a maximum value (100) of the second ultradeep image data of the unit region is then deleted.

Subsequently, the value of the second ultradeep image data is compressed at a ratio of (tp1/tp2). Specifically, if the value tp1 is 3 and the value tp2 is 97, (3/97) is multiplied to the value of the second ultradeep image data. Thereafter, the first ultradeep image data and the compressed second ultradeep image data are synthesized.

The data of after compression of the portion corresponding to the pixel having a peak intensity greater than the value tp2 and smaller than the maximum value (100) of the second ultradeep image data overlaps the data of the portion corresponding to the pixel having a peak intensity greater than the value tp1 and smaller than the value (3.09) (=100×(3/97)) of the remaining first ultradeep image data. Thus, an average value of the first ultradeep image data and the compressed second ultradeep image data is calculated as the ultradeep image data of after synthesis at the overlapping portion of the first ultradeep image data and the compressed second ultradeep image data.

An ultradeep image V3 in which the ultradeep images V1, V2 are synthesized is thereby obtained, as shown in FIG. 5C. In the ultradeep image V3, the upper end portion SU to the side end portions SE1, SE2 of the surface of the observing target S of FIGS. 4A and 4B is clearly shown with contrast of plural levels. The boundary of the image SV3 showing the outer peripheral surface on the upper side of the observing target S and the region SZ other than the image SV3 can also be definitely identified by the contrast.

In addition to the above description, after the height image data of the unit region is generated with the first sensitivity value and the height image data of the unit region is generated with the second sensitivity value, the two height image data are synthesized. The height image data generated with the first sensitivity value is referred to as first height image data, and the height image data generated with the second sensitivity value is referred to as second height image data.

First, the data of the portion corresponding to the pixel having a peak intensity of smaller than or equal to the value tp1 of the first height image data of the unit region is deleted. Then, the data of the portion corresponding to the pixel having a peak intensity of a maximum value (100) of the second height image data of the unit region is deleted.

Subsequently, the first height image data and the second height image data are synthesized. In this case as well, the data of the portion corresponding to the pixel having a peak intensity greater than the value tp2 and smaller than the maximum value (100) of the second height image data overlaps the data of the portion corresponding to the pixel having a peak intensity greater than the value tp1 and smaller than the value (3.09)(=100×(3/97)) of the remaining first height image data. Thus, an average value of the first height image data and the second height image data is calculated as the height image data of after synthesis at the overlapping portion of the first height image data and the second height image data. The first and second height image data are synthesized in such manner.

The wide dynamic range process according to the present embodiment is terminated when the ultradeep image data and the height image data are generated by the first sensitivity value if the invalid pixel ratio is smaller than or equal to the reference pixel ratio. Thus, the height image data and the ultradeep image data showing the state of the surface of the observing target S are generated in one measurement. Therefore, the state of the surface of the observing target S can be detected in a short time.

(5) Setting of Wide Dynamic Range Process

Figure 6:
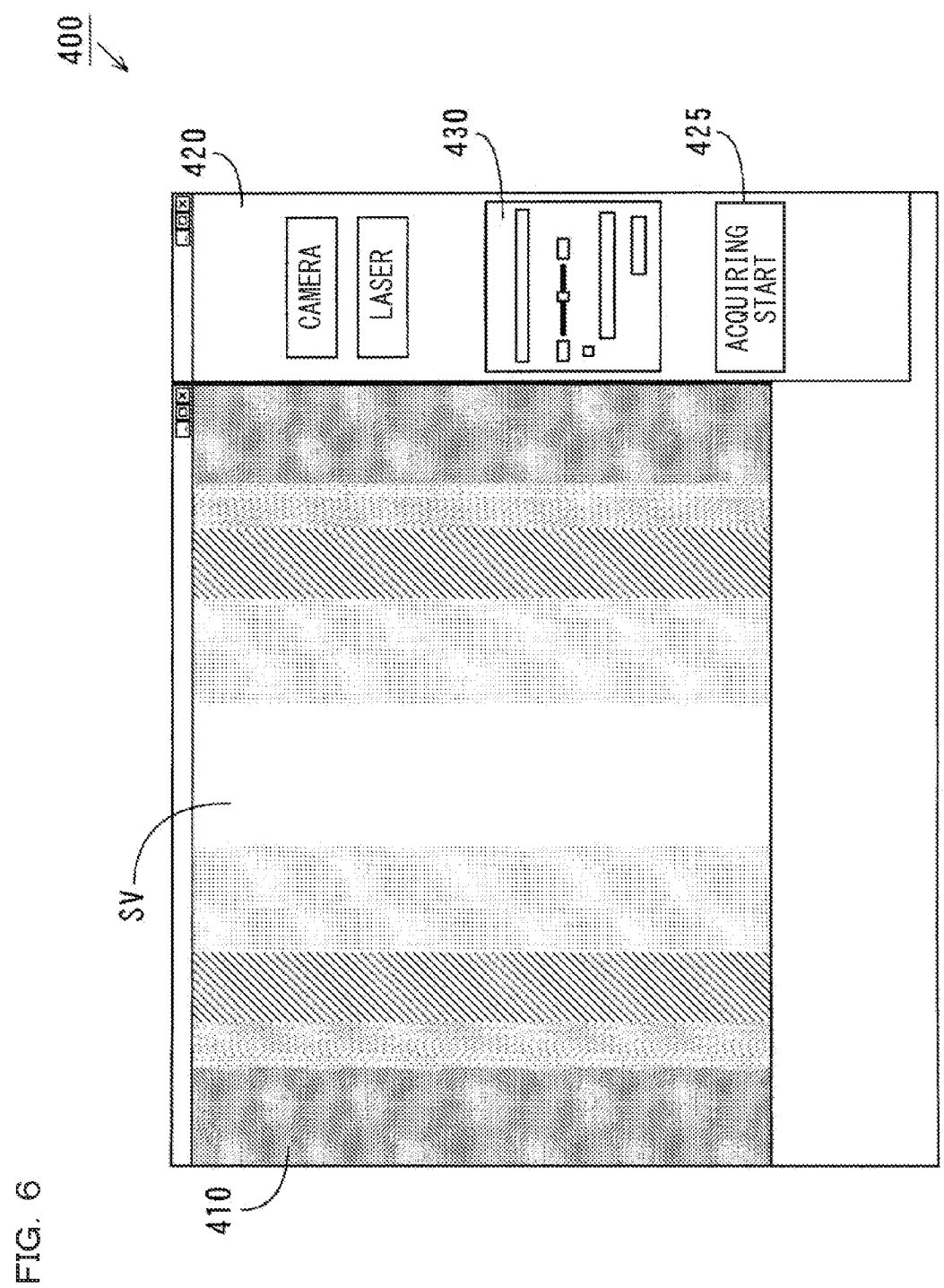
FIG. 6 is a view showing one display example of the display unit.

FIG. 6 is a view showing one display example of the display unit 400. As shown in FIG. 6, an image display region 410 and a condition setting region 420 are displayed on a screen of the display unit 400. A confocal image based on the confocal image data and a camera image based on the camera image data are displayed in the image display region 410. The confocal image SV showing the outer peripheral surface on the upper side of the observing target S of FIGS. 4A and 4B is displayed in the image display region 410. An acquiring start button 425 and a first sensitivity parameter setting frame 430 are displayed in the condition setting region 420.

The first sensitivity parameter setting frame 430 includes a plurality of buttons and an operation bar. The user operates the plurality of buttons and the operation bar in the first sensitivity parameter setting frame 430 using a pointing device such as a mouse connected to the PC 200 with the confocal image or the camera image displayed in the image display region 410. The setting of the wide dynamic range process then can be carried out. The details of the first sensitivity parameter setting frame 430 will be described later.

When the user operates the acquiring start button 425 of the condition setting region 420, the laser light is scanned in the X direction and the Y direction of the unit region at a plurality of positions in the Z direction, and a plurality of pixel data is acquired. A plurality of confocal image data corresponding to a plurality of different positions in the Z direction is generated in the unit region, and the height image data and the ultradeep image data are generated based on the plurality of generated confocal image data. The generating operation of the height image data and the ultradeep image data changes according to the setting content of the wide dynamic range process by the operation of the first sensitivity parameter setting frame 430 by the user.

Figure 7:
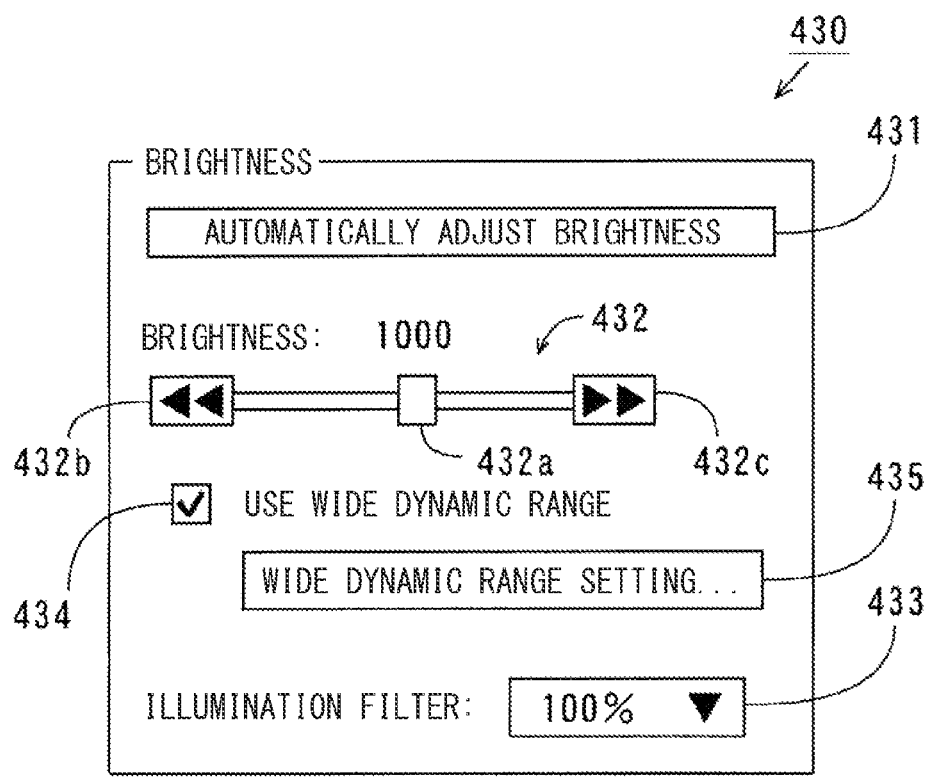
FIG. 7 is a view showing a first sensitivity parameter setting frame of FIG. 6.

The details of the first sensitivity parameter setting frame 430 will be described. FIG. 7 is a view showing the first sensitivity parameter setting frame 430 in FIG. 6. As shown in FIG. 7, the first sensitivity parameter setting frame 430 displays a first sensitivity value automatic setting button 431, a gain manual adjustment bar 432, a filter manual adjustment column 433, a check box 434, and a wide dynamic range setting button 435. The gain manual adjustment bar 432 includes a slider 432a movable in the horizontal direction, a left button 432b and a right button 432c. In the gain manual adjustment bar 432, the position of the slider 432a corresponds to the magnitude of the gain of the light receiving element 30 at the current time point.

The user operates the first sensitivity value automatic setting button 431 of FIG. 7 with the observing target S mounted on the stage 60 of the confocal microscope system 500 of FIG. 1. The scanning in the X direction and the Y direction of the unit region is thereby carried out while moving the objective lens 3 to a plurality of positions in the Z direction, and the value of the sensitivity parameter is set to the first sensitivity value so that all the values of the plurality of acquired pixel data are smaller than the output upper limit value max.

As described above, the first sensitivity value may be set by the user. The user can change the position of the slider 432a by operating either the left button 432b or the right button 432c. In this case, the control unit 300 controls the gain of the light receiving element 30 according to the changed position of the slider 432a to set the first sensitivity value. The user can change the attenuation rate of the laser light by the ND filter 8 of FIG. 1 by operating the filter manual adjustment column 433. In this case, the control unit 300 controls the attenuation rate of the laser light by the ND filter 8 based on the operation of the filter manual adjustment column 433 by the user to set the first sensitivity value.

When the user specifies the check box 434 with the first sensitivity value set, the operation of the wide dynamic range setting button 435 is validated.

Figure 8:
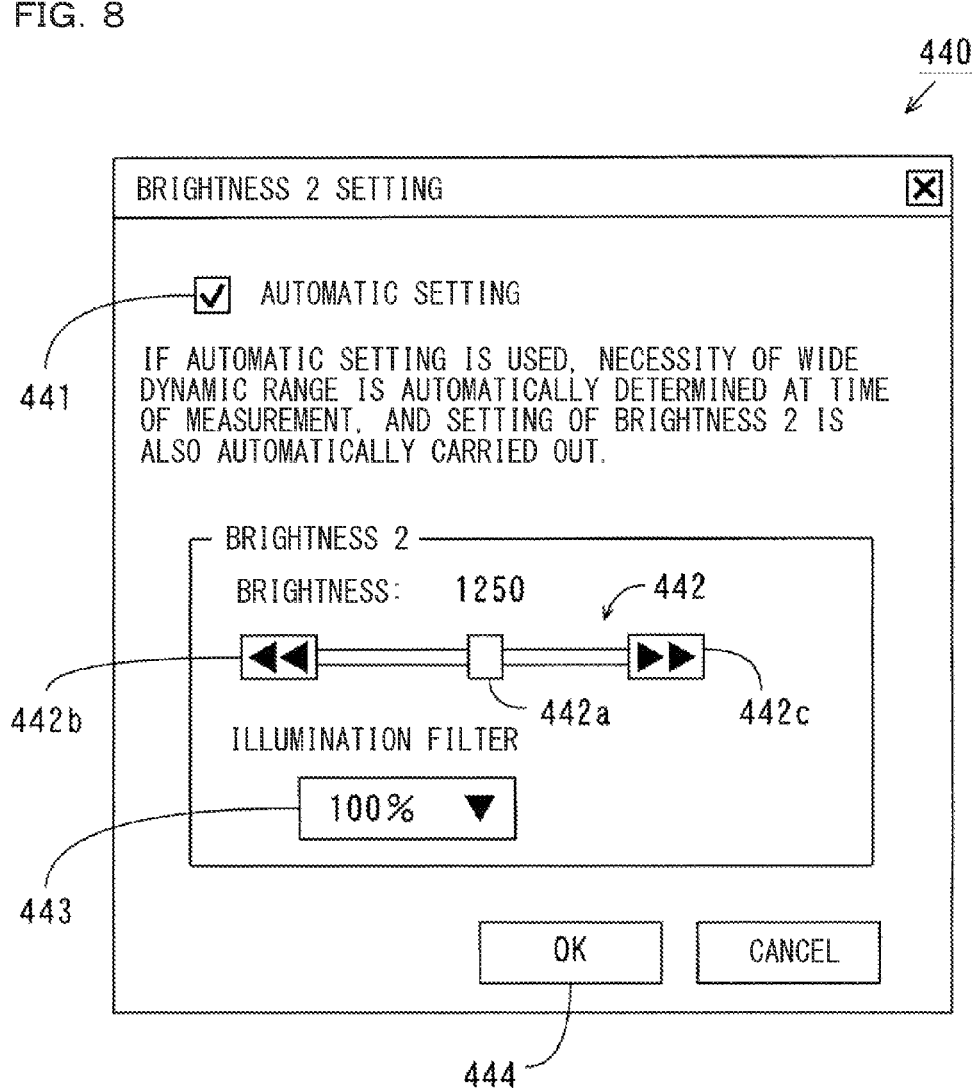
FIG. 8 is a view showing a second sensitivity parameter setting window.

When the user operates the wide dynamic range setting button 435, a second sensitivity parameter setting window is displayed in the display unit 400 of FIG. 6. FIG. 8 is a view showing the second sensitivity parameter setting window.

As shown in FIG. 8, the second sensitivity parameter setting window 440 displays a check box 441, a gain manual adjustment bar 442, a filter manual adjustment column 443, and an OK button 444.

In the second sensitivity parameter setting window 440, the user operates the OK button 444 after specifying the check box 441. In this case, when the acquiring start button 425 of FIG. 6 is operated, the height image data and the ultradeep image data of the unit region are generated with the first sensitivity value set, and then the invalid pixel ratio is calculated.

If the calculated invalid pixel ratio is greater than the reference pixel ratio, the sensitivity parameter is changed to the second sensitivity value higher than the first sensitivity value. Thereafter, the height image data and the ultradeep image data of the unit region are generated with the second sensitivity value set. Lastly, the first and second height image data generated with the first sensitivity value and the second sensitivity value are synthesized, and the first and second ultradeep image data generated with the first sensitivity value and the second sensitivity value are synthesized. Therefore, the state of the surface of the observing target S can be accurately detected without the user performing a troublesome operation even if the state of the surface of the observing target S differs for every region.

If the calculated invalid pixel ratio is smaller than or equal to the reference pixel ratio, the height image data and the ultradeep image data of the unit region are generated based on the pixel data acquired with the first sensitivity value set, and the wide dynamic range process is terminated. The height image data and the ultradeep image data thus are generated in a short time based on the plurality of pixel data acquired in one measurement without the user performing a troublesome operation.

Similar to the first sensitivity value, the second sensitivity value may be manually set by the user. In the gain manual adjustment bar 442, the position of the slider 442a corresponds to the magnitude of the gain of the light receiving element 30 at the current time point.

The operation of the gain manual adjustment bar 442 and the filter manual adjustment column 443 is enabled in a state the check box 441 is not specified. In this case, the user can change the position of the slider 442a by operating one of the slider 442a, the left button 442b, or the right button 442c without specifying the check box 441. The user operates the OK button 444 after operating the gain manual adjustment bar 442 in the second sensitivity parameter setting window 440.

In this case, the control unit 300 controls the gain of the light receiving element 30 based on the position of the slider 442a in the gain manual adjustment bar 442 to set the second sensitivity value after the first height image data and the first ultradeep image data of the unit region are generated with the first sensitivity value when the acquiring start button 425 of FIG. 6 is operated.

The user can also set the attenuation rate of the laser light by the ND filter 8 to the desired value by operating the filter manual adjustment column 443. The user operates the OK button 444 after operating the filter manual adjustment column 443 in the second sensitivity parameter setting window 440.

In this case, the control unit 300 controls the attenuation rate of the laser light by the ND filter 8 based on the value set by the user to set the second sensitivity value after the first height image data and the first ultradeep image data of the unit region are generated with the first sensitivity value when the acquiring start button 425 of FIG. 6 is operated.

Therefore, if the second sensitivity value is set by the user, the second height image data and the second ultradeep image data of the unit region are generated with the second sensitivity value set after the first height image data and the first ultradeep image data of the unit region are generated with the first sensitivity value set. Thereafter, the first and second height image data are synthesized, and the first and second ultradeep image data are synthesized.

(6) Surface State Observing Process Flow

FIG. 9 to FIG. 12 are flowcharts of the surface state observing process. The wide dynamic range process configures one part of the surface state observation process. The surface state observation process starts when the user operates the first sensitivity parameter setting frame 430 of FIG. 6 and FIG. 7. The CPU 210 of FIG. 1 executes the surface state observation program stored in the storage device 240 to carry out the surface state observation process.

Figure 9:
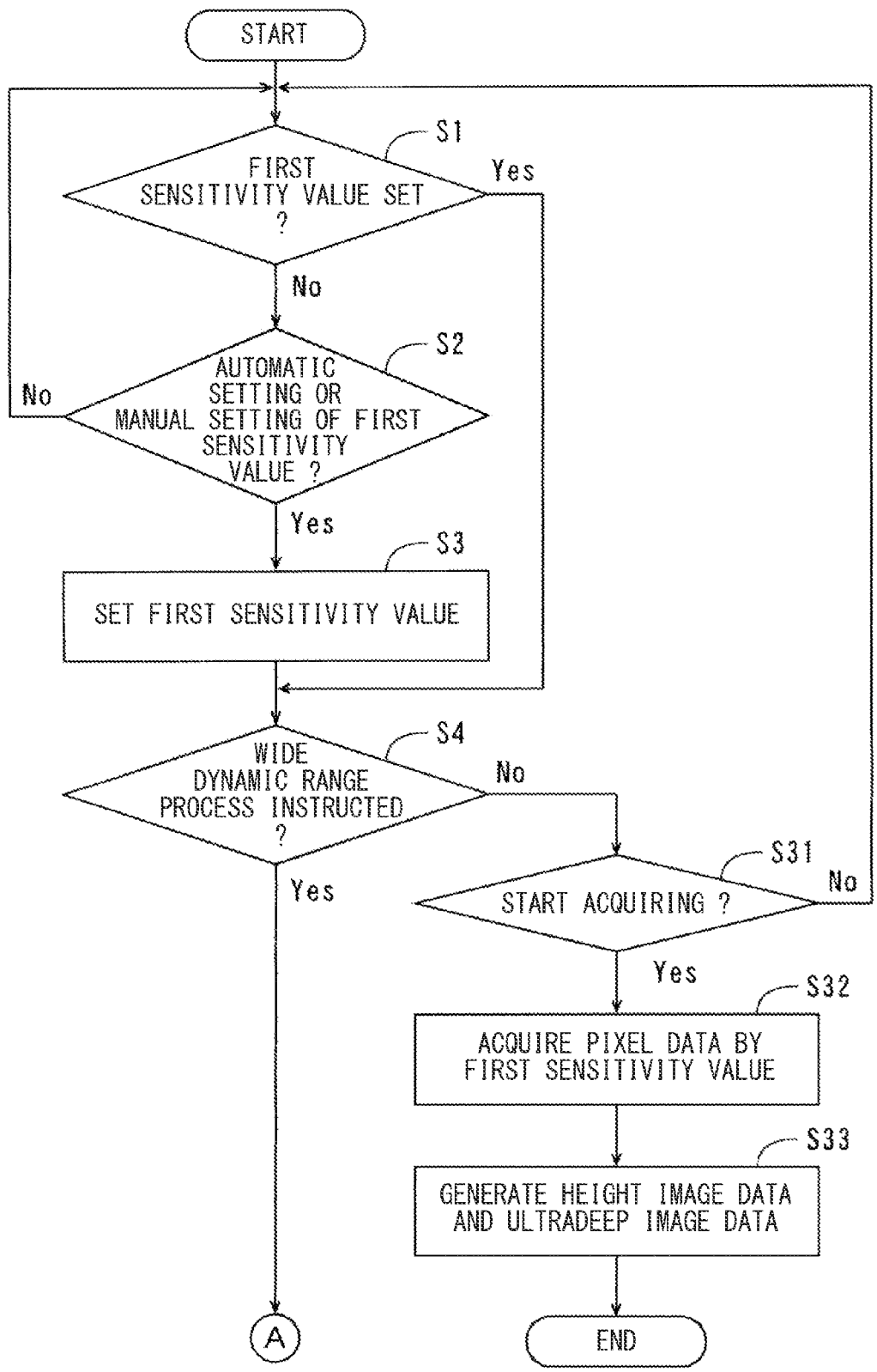
FIG. 9 is a flowchart of a surface state observing process.
Figure 10:
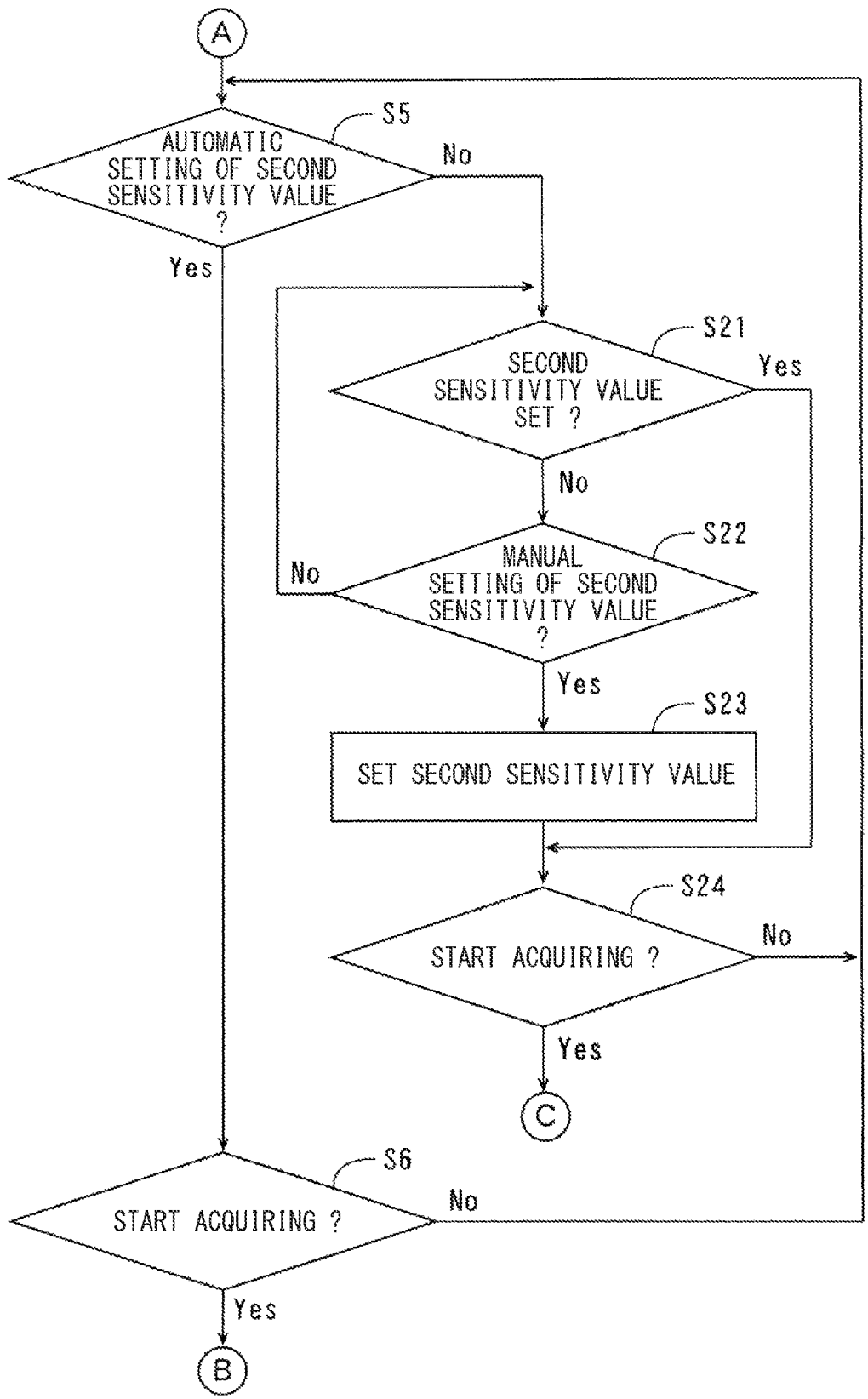
FIG. 10 is a flowchart of the surface state observing process.
Figure 11:
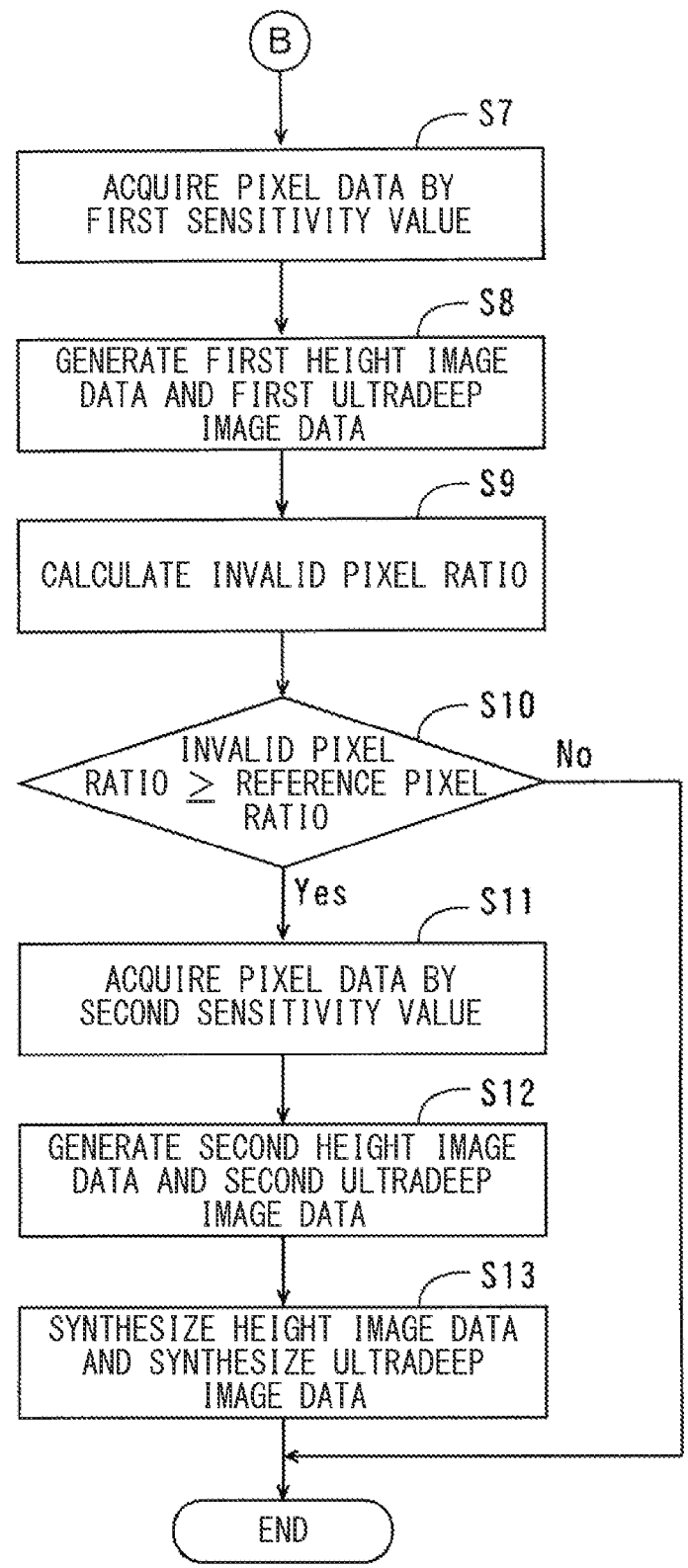
FIG. 11 is a flowchart of the surface state observing process.
Figure 12:
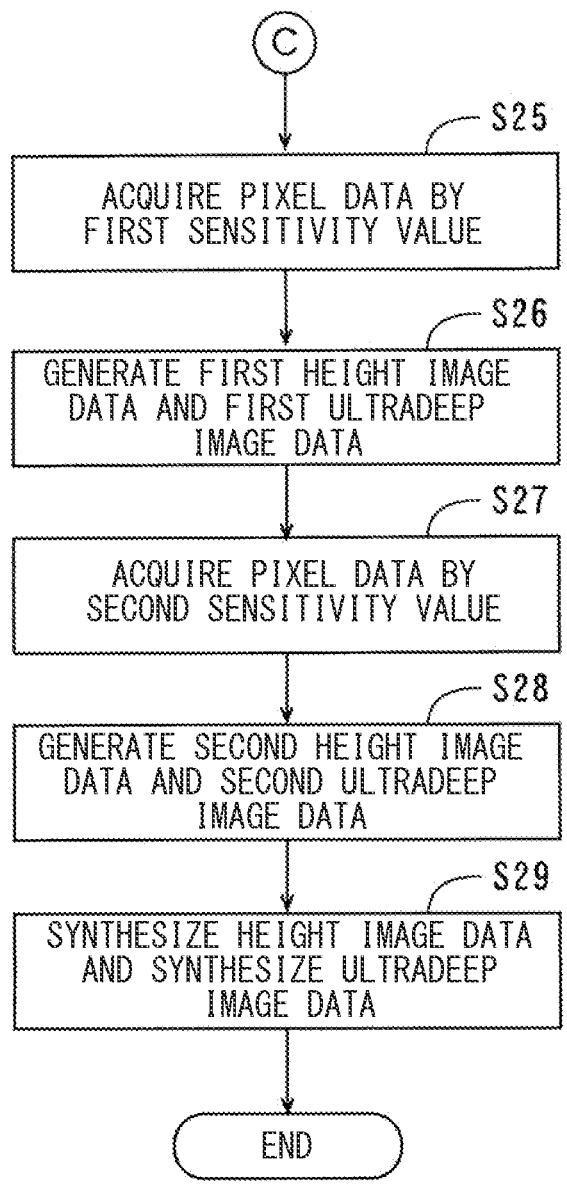
FIG. 12 is a flowchart of the surface state observing process.

As shown in FIG. 9, the CPU 210 first determines whether or not the first sensitivity value is set (step S1). Specifically, the CPU 210 determines that the first sensitivity value is set if the value of the sensitivity parameter is stored in the work memory 230 of FIG. 1 as the first sensitivity value, and determines that the first sensitivity value is not set if the value of the sensitivity parameter is not stored in the work memory 230 as the first sensitivity value.

If the first sensitivity value is set, the CPU 210 proceeds to the process of step S4, to be described later. If the first sensitivity value is not set, the CPU 210 determines whether or not the automatic setting or the manual setting of the first sensitivity value is instructed based on whether or not either one of the first sensitivity value automatic setting button 431, the gain manual adjustment bar 432, or the filter manual adjustment column 433 of FIG. 7 is operated by the user (step S2).

If neither the automatic setting nor the manual setting of the first sensitivity value is instructed, the CPU 210 returns to the process of step S1. The CPU 210 automatically sets the first sensitivity value if the automatic setting of the first sensitivity value is instructed, and sets the first sensitivity value according to the operation of the gain manual adjustment bar 432 and the filter manual adjustment column 433 by the user when the manual setting of the first sensitivity value is instructed (step S3).

The CPU 210 then determines whether or not the wide dynamic range process is instructed based on whether or not the check box 434 of FIG. 7 is specified by the user (step S4).

If the wide dynamic range process is instructed, the CPU 210 determines whether or not the automatic setting of the second sensitivity value is instructed based on whether or not the check box 441 of FIG. 8 is specified by the user (step S5).

If the automatic setting of the second sensitivity value is instructed, the CPU 210 determines whether or not the start of the acquiring of a plurality of image data of the unit region is instructed based on whether or not the acquiring start button 425 of FIG. 6 is operated by the user (step S6).

If the start of the acquiring of the image data is not instructed, the CPU 210 returns to the process of step S5. If the start of the acquiring of the image data is instructed, the CPU 210 acquires a plurality of pixel data by the first sensitivity value (step S7).

The CPU 210 generates the first height image data and the first ultradeep image data based on the acquired plurality of pixel data (step S8). The CPU 210 then calculates an invalid pixel ratio as a value (hereinafter referred to as determination value) for determining whether or not to acquire a plurality of pixel data by the second sensitivity value based on the first height image data and the first ultradeep image data (step S9).

The CPU 210 then determines whether or not the invalid pixel ratio is greater than or equal to the reference pixel ratio (step S10). If the invalid pixel ratio is smaller than the reference pixel ratio, the CPU 210 terminates the surface state observing process. If the invalid pixel ratio is greater than or equal to the reference pixel ratio, the CPU 210 acquires a plurality of pixel data by the second sensitivity value stored in the work memory 230 in advance (step S11). The CPU 210 then generates the second height image data and the second ultradeep image data based on the acquired plurality of pixel data (step S12).

Lastly, the CPU 210 synthesizes the first height image data and the second height image data and synthesizes the first ultradeep image data and the second ultradeep image data (step S13), and terminates the surface state observing process.

If the automatic setting of the second sensitivity value is not instructed in step S5, the CPU 210 determines whether or not the second sensitivity value is set manually by the user (step S21).

If the second sensitivity value is set, the CPU 210 proceeds to the process of step S24. If the second sensitivity value is not set, the CPU 210 determines whether or not the manual setting of the second sensitivity value is instructed based on whether or not either one of the gain manual adjustment bar 442 or the filter manual adjustment column 443 of FIG. 8 is operated by the user (step S22).

If the manual setting of the second sensitivity value is not instructed, the CPU 210 returns to the process of step S21. The CPU 210 sets the second sensitivity value according to the operation of at least one of the gain manual adjustment bar 442 or the filter manual adjustment column 443 of FIG. 8 by the user when the manual setting of the second sensitivity value is instructed (step S23).

The CPU 210 determines whether or not the start of the acquiring of the plurality of image data of the unit region is instructed based on whether or not the acquiring start button 425 of FIG. 6 is operated by the user (step S24).

If the start of the acquisition of the image data is not instructed, the CPU 210 returns to the process of step S5. If the start of the acquisition of the image data is instructed, the CPU 210 acquires the plurality of pixel data by the first sensitivity value (step S25).

The CPU 210 then generates the first height image data and the first ultradeep image data based on the acquired plurality of pixel data (step S26).

The CPU 210 then acquires the plurality of pixel data by the second sensitivity value stored in the work memory 230 in advance (step S27). The CPU 210 generates the second height image data and the second ultradeep image data based on the acquired plurality of pixel data (step S28).

Lastly, the CPU 210 synthesizes the first height image data and the second height image data and synthesizes the first ultradeep image data and the second ultradeep image data (step S29), and terminates the surface state observing process.

If the wide dynamic range process is not instructed in step S4, the CPU 210 determines whether or not the start of the acquiring of the plurality of image data of the unit region is instructed based on whether or not the acquiring start button 425 of FIG. 6 is operated by the user (step S31).

If the start of the acquiring of the image data is not instructed, the CPU 210 returns to the process of step S1. If the start of the acquiring of the image data is instructed, the CPU 210 acquires the plurality of pixel data by the first sensitivity value (step S32). The CPU 210 then generates the height image data and the ultradeep image data based on the acquired plurality of pixel data (step S33), and terminates the surface state observing process.

In the above surface state observing process flow, a series of processes of steps S5 to 13, and S21 to S29 correspond to the wide dynamic range process described above.

(7) Other Embodiments (7-1) In the above embodiment, the invalid pixel ratio is used as a determination value for determining whether or not to acquire the plurality of pixel by the second sensitivity value after the generation of the first height image data and the first ultradeep image data, but a value different from the invalid pixel ratio may be used as the determination value.

For instance, the CPU 210 calculates the sum or the average value of the values of the plurality of peak intensities corresponding to the plurality of pixels (e.g., five pixels, ten pixels, or all pixels, etc. in the unit region) in the region defined in advance of the surface of the observing target S as the determination value after the generation of the first height image data and the first ultradeep image data.

In this case, the reference value is stored in advance in the storage device 240 of FIG. 1. The CPU 210 thus determines whether or not the sum or the average value of the values of the plurality of peak intensities is greater than or equal to the reference value, and terminates the surface state observing process if the sum or the average value is smaller than the reference value and acquires the plurality of pixel data by the second sensitivity value if the sum or the average value is greater than or equal to the reference value.

Alternatively, the CPU 210 stores the data representing a plurality of peak positions corresponding to all the pixels in the unit region as raw data in the work memory 23 based on the generated height image data after the generation of the first height image data and the first ultradeep image data. The CPU 210 also performs a smoothing process (median filter processing etc.) for removing noise with respect to the raw data, and stores the data after the smoothing process in the work memory 230 as the process data. Thereafter, the CPU 210 reads the raw data and the process data stored in the work memory 230, and calculates the difference between the corresponding process data and the raw data for every pixel as the difference data. The CPU 210 then calculates the sum or the average value of the difference data calculated for every pixel as the determination value.

In this case as well, the reference value is stored in advance in the storage device 240 of FIG. 1. The CPU 210 determines whether or not the sum or the average value of the plurality of difference data is greater than or equal to the reference value, and terminates the surface state observing process if the sum or the average value is smaller than the reference value and acquires the plurality of pixel data by the second sensitivity value if the sum or the average value is greater than or equal to the reference value.

(7-2) In the above described embodiment, the second sensitivity value is defined in advance. Not limited thereto, the second sensitivity value may be automatically determined by the CPU 210 based on the plurality of pixel data acquired with the first sensitivity value. In this case, the second sensitivity value can be set to an appropriate value.

For instance, the second sensitivity value is set such that the number of pixels corresponding to the overlapping portion of the two ultradeep image data becomes greater than or equal to a constant number when synthesizing the first ultradeep image data in which one part is deleted and the compressed second ultradeep image data.

In this case, the pattern matching can be carried out between the first ultradeep image data in which one part is deleted and the compressed second ultradeep image data. Therefore, the first ultradeep image data and the compressed second ultradeep image data can be accurately synthesized.

Similarly, the second sensitivity value is set such that the number of pixels corresponding to the overlapping portion of the two height image data becomes greater than or equal to a constant number when synthesizing the first height image data in which one part is deleted and the second height image data in which one part is deleted.

In this case as well, the pattern matching can be carried out between the first height image data in which one part is deleted and the second height image data in which one part is deleted. Therefore, the first height image data and the second height image data can be accurately synthesized.

(7-3) In the above description, the value tp1 for calculating the invalid pixel ratio corresponds to the noise level n1, but the value tp1 may be automatically determined by the CPU 210 based on the plurality of pixel data acquired with the first sensitivity value.

For instance, the value tp1 is set such that the number of pixels corresponding to the overlapping portion of the two ultradeep image data becomes greater than or equal to a constant number when synthesizing the first ultradeep image data in which one part is deleted and the compressed second ultradeep image data.

In this case, the pattern matching can be carried out between the first ultradeep image data in which one part is deleted and the compressed second ultradeep image data. Therefore, the first ultradeep image data and the compressed second ultradeep image data can be accurately synthesized.

Similarly, the value tp1 is set such that the number of pixels corresponding to the overlapping portion of the two height image data becomes greater than or equal to a constant number when synthesizing the first height image data in which one part is deleted and the second height image data in which one part is deleted.

In this case as well, the pattern matching can be carried out between the first height image data in which one part is deleted and the second height image data in which one part is deleted. Therefore, the first height image data and the second height image data can be accurately synthesized.

(7-4) In the above description, the invalid pixel ratio is not calculated and the determination on whether or not the invalid pixel ratio is smaller than or equal to the reference pixel ratio is not carried out when the check box 441 of FIG. 8 is not specified. Not limited thereto, the CPU 210 may determinate whether or not to carry out the acquisition of the pixel data by the second sensitivity value based on the determination result on whether or not the invalid pixel ratio is smaller than or equal to the reference pixel ratio after the generation of the first height image data and the first ultradeep image data of the unit region by the first sensitivity value even if the check box 441 of FIG. 8 is not specified.

(7-5) In the above description, the surface state observing process is executed in the confocal microscope system 500.

Not limited thereto, the surface state observing process can be applied to a microscope system adapted to project the light from the light source through the objective lens 3 so as to converge at the observing target and observe the state of the surface of the observing target based on the digital signal acquired in correspondence with the strength of the light guided to the light receiving element 30. The microscope system for observing the state of the surface of the observing target while moving the focus position of the projected light in the optical axis direction includes a microscope system using a light interferometry, an optical microscope system, and the like.

(7-6) In the embodiment described above, the laser light is scanned in the X direction and the Y direction on the observing target S by controlling the X-Y scan optical system 20, but this is not the sole case. The laser light may be scanned in the X direction and the Y direction on the observing target S by moving the stage 60.

A line light (e.g. elongate light extending in the X direction) may be used as the laser light. In this case, a Y-scan optical system that does not perform the scanning in the X direction is used instead of the X-Y scan optical system 20. Furthermore, a line CCD camera or the like including a plurality of light receiving elements arrayed in a direction corresponding to the X-direction is used instead of the light receiving element 30.

The size of the light receiving surface in the direction corresponding to the Y direction of each light receiving element of the line CCD camera is generally a few dozen μm. In this case, the light receiving surface of the line CCD camera is arranged on the focus position of the lens 2. When the surface of the observing target S is at the focus position of the objective lens 3, the line light reflected by the observing target S is collected on the light receiving surface of the line CCD camera. Most of the line light reflected by the observing target S thus enters the light receiving surface of the line CCD camera.

When the observing target S is at a position deviated from the focus position of the objective lens 3, the line light reflected by the observing target S is collected at a position in front or back of the light receiving surface of the line CCD camera. Only one part of the line light reflected by the observing target S thus enters the light receiving surface of the line CCD camera. Therefore, the pin hole member 7 does not need to be arranged in front of the line CCD camera.

(7-7) In the embodiment described above, the relative position in the Z direction of the observing target S with respect to the objective lens 3 changes when the objective lens 3 is moved in the Z direction, but this is not the sole case. The relative position in the Z direction of the observing target S with respect to the objective lens 3 may be changed by moving the stage 60 in the Z direction.

(7-8) In the embodiment described above, the laser light is scanned in the X direction and the Y direction on the observing target S by controlling the X-Y scan optical system 20, but this is not the sole case. The laser light may be scanned in the X direction and the Y direction on the observing target S by moving the stage 60.

(7-9) In the embodiment described above, the CPU 210 of the PC 200 may have the function of the control unit 300. In this case, the control unit 300 may not be arranged.

(8) Correspondence Relationship of Each Configuring Element of the Claims and Each Unit of the Embodiment Hereinafter, a correspondence example of each configuring element of the Claims and each unit of the embodiment will be descried, but the present invention is not limited to the following example.

The observing target S serves as an observing target, the confocal microscope system 500 serves as a microscope system, the laser light source 10 serves as a light source, the light receiving element 30 serves as a light receiving element, and the lenses 1, 2, the objective lens 3, the half mirrors 4 to 6, the pin hole member 7, and the ND filter 8 serve as an optical system.

Furthermore, the plurality of data acquired with the first sensitivity value and the second sensitivity value serves as pixel data, the pixel data indicating a peak value (peak intensity) of each pixel serves as image data, the control unit 300 serves as a pixel data output unit, the PC 200 serves as a sensitivity setting unit, an image data generating unit, and a processing device, the first sensitivity value serves as a first value, and the second sensitivity value serves as a second value.

Furthermore, the value tp1 for calculating the invalid pixel ratio serves as a threshold value, and the height image data as well as the ultradeep image data serves as surface image data. The invalid pixel ratio, the sum or the average value of the values of the plurality of peak intensities, or the sum or the average value of the plurality of difference data serves as a determination value, and the fact that the invalid pixel ratio calculated after the acquisition of the plurality of pixel data by the first sensitivity value is smaller than or equal to the reference pixel ratio, the fact that the sum or the average value of the plurality of peak intensities is greater than or equal to the reference value, or the fact that the sum or the average value of the plurality of difference data is greater than or equal to the reference value serves as a condition defined in advance.

Various other elements having the configuration or the function described in the Claims may be used for each configuring element of the Claims.

The present invention can be effectively used in various microscope systems.

What is claimed is:

1. A confocal microscopy system, comprising:
   a light source for emitting a laser to an observing target;
   a scan optical system for two-dimensionally scanning the laser from the light source;
   an objective lens for collecting the laser scanned by the scan optical system on the observing target;
   a light receiving element for receiving a light, the light being a reflected light of the laser from the observing target;
   a pixel data output unit for outputting pixel data corresponding to a plurality of pixels based on an output signal of the light receiving element;
   a sensitivity setting unit for setting a sensitivity parameter for adjusting a value of the pixel data by controlling at least one of the light source or the light receiving element;
   an image data generating unit for generating an ultradeep image data based on the pixel data outputted from the pixel data output unit, the pixel data being obtained by changing a relative distance between the objective lens and the observing target along the optical axis of the objective lens, each pixel of the ultradeep image data representing a peak intensity of the light receiving intensity distribution along an optical axis of the objective lens;
   wherein the image data generating unit includes a first function, second function and a third function,
   the first function is configured to generate a first ultradeep image data by changing relative distance between the objective lens and the observing target in a condition of the sensitivity parameter being the first sensitivity value, when the start of the acquisition of the first ultradeep image data is instructed,
   the second function is configured to determine whether the peak intensity indicated by each pixel of the first ultradeep image data satisfies a condition defined in advance and to change the sensitivity parameter to a second sensitivity value which is greater than the first sensitivity value based on the determination result; and the third function is configured to generate a second ultradeep image data by changing relative distance between the objective lens and the observing target in a condition of the sensitivity parameter being the second sensitivity value, and wherein the image data generating unit, based on the determination result by the second function, generates a surface image data which represents a surface state of the observing target from the first ultradeep image data or generates the surface image data from a synthesized data of the first ultradeep image data and the second ultradeep image data.

2. The confocal microscopy system according to claim 1, wherein the image data generation unit, in the second function, generates a determination value relating to the peak intensity based on the first ultradeep image data and determines to compare the determination value and a predetermined threshold.

3. The confocal microscopy system according to claim 1, further comprising, a movement mechanism for moving the objective lens along with the optical axis of the objective lens, and wherein the image data generation unit changes the relative distance between the objective lens and the observing target by controlling the movement mechanism in the first function and the third function.

4. The confocal microscopy system according to claim 1, further comprising, a receiving optical system configured to guide the reflected light of the laser from the observing target to the light receiving element, and wherein the sensitivity setting unit is configured to set the sensitivity parameter by controlling at least one of a quantity of the laser of the light source, a gain of the light receiving element and an attenuation amount of the light in the receiving optical system.

5. The confocal microscopy system according to claim 4, wherein the sensitivity setting unit preferentially controls the quantity of the light emitted from the light source or the attenuation amount of the light in the optical system over the gain of the light receiving element when changing the sensitivity parameter from the first sensitivity value to the second sensitivity value.

6. The confocal microscopy system according to claim 1, wherein the sensitivity setting unit determines the second sensitivity value based on the first ultradeep image data.

7. The confocal microscopy system according to claim 1, wherein the image data generating unit generates the surface image data from the first ultradeep image data and does not generate the second ultradeep image data, if the condition is satisfied in the second function, and generates the surface image data from the synthesized data of the first ultradeep image and the second ultradeep image, if the condition is not satisfied in the second function.

8. A method used in a confocal microscopy system, the method comprising the steps of;

emitting a laser to an observing target from a light source;

two-dimensionally scanning with the laser from the light source on an observing target and collecting reflected light of the laser from the observing target with a light receiving element;

outputting pixel data corresponding to a plurality of pixels based on an output signal of the light receiving element;

setting a sensitivity parameter for adjusting a value of the pixel data by controlling at least one of the light source or the light receiving element;

generating an ultradeep image data based on the pixel data outputted from the sensitivity parameter;

including a first function, second function and a third function, and determining whether or not a result of the first function, second function and third function satisfies a condition defined in advance based on the generated determination value; and obtaining the pixel data by changing a relative distance between an objective lens and the observing target along an optical axis of the objective lens, each pixel of the ultradeep image data representing a peak intensity of light receiving intensity distribution along the optical axis of the objective lens;

wherein the generating of the image the ultradeep image data includes said first function, second function and third function, and wherein the first function is configured to generate a first ultradeep image data by changing the relative distance between the objective lens and the observing target in a condition of the sensitivity parameter being a first sensitivity value, at the beginning of acquiring the first ultradeep image data, the second function is configured to determine whether the peak intensity indicated by each pixel of the first ultradeep image data satisfies a condition defined in advance and to change the sensitivity parameter to a second sensitivity value which is greater than the first sensitivity value based on a determination result; and the third function is configured to generate a second ultradeep image data by changing the relative distance between the objective lens and the observing target in a condition of the sensitivity parameter being the second sensitivity value, and and generating surface image data which represents surface state of the observing target from the first ultradeep image data or generates the surface image data from a synthesized data of the first ultradeep image data and the second ultradeep image data.

* * * * *